(12) United States Patent
Sánchez De La Fuente et al.

(10) Patent No.: US 12,739,438 B2
(45) Date of Patent: Sep. 15, 2026

(54) SIGNALING OF VISUAL CONTENT

(71) Applicant: Fraunhofer-Gesellschaft zur Foerderung der angewandten Forschung e.V., Munich (DE)

(72) Inventors: Yago Sánchez De La Fuente, Berlin (DE); Robert Skupin, Berlin (DE); Cornelius Hellge, Berlin (DE); Thomas Schierl, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 18/190,883

(22) Filed: Mar. 27, 2023

(65) Prior Publication Data

US 2023/0239510 A1 Jul. 27, 2023

Related U.S. Application Data

(63) Continuation of application No. PCT/EP2021/076873, filed on Sep. 29, 2021.

(30) Foreign Application Priority Data

Sep. 30, 2020 (EP) .................................... 20199471

(51) Int. Cl.
*H04N 19/70* (2014.01)
*H04N 19/136* (2014.01)
(Continued)

(52) U.S. Cl.
CPC ........... *H04N 19/70* (2014.11); *H04N 19/136* (2014.11); *H04N 19/162* (2014.11); *H04N 19/172* (2014.11)

(58) Field of Classification Search
None
See application file for complete search history.

(56) References Cited

U.S. PATENT DOCUMENTS 8,125,480 B2 * 2/2012 Schiwietz ............... G06T 15/08 345/419
9,251,624 B2 * 2/2016 Ito ........................... G06T 17/00
(Continued)

FOREIGN PATENT DOCUMENTS

CN 106971403 A * 7/2017 ........... H04L 65/602
CN 109155874 A 1/2019
(Continued)

OTHER PUBLICATIONS

"Emerging MPEG Standards for Point Cloud Compression"—Schwarz et al., IEEE Journal on Emerging and Selected Topics in Circuits and Systems, vol. 9, No. 1, Mar. 2019 (Year: 2019).*
(Continued)

*Primary Examiner* — Mainul Hasan
(74) *Attorney, Agent, or Firm* — ASHURST PERKINS COIE US LLP; Michael A. Glenn

(57) ABSTRACT

Concepts for signaling visual content are described. According to one aspect, a picture representing a projection of a volumetric representation onto a projection plane is provided in a bitstream along with a geometric representation of the projection plane. According to a further aspect, a regions of a composed picture signaled in a bitstream are associated with a number of pictures of a number of projections of objects. According to a further aspect, regions of a composed picture signaled in a bitstream are associated with respective information types of a picture.

7 Claims, 15 Drawing Sheets

(51) Int. Cl.
*H04N 19/162* (2014.01)
*H04N 19/172* (2014.01)

(56) References Cited

U.S. PATENT DOCUMENTS 10,497,180 B1 12/2019 Perfilev et al.
11,430,156 B2 * 8/2022 Aflaki Beni ......... H04N 13/161
2004/0001112 A1 * 1/2004 Kurtenbach ............ G06T 15/00 715/848
2010/0215226 A1 * 8/2010 Kaufman ................ G06T 3/067 382/128
2012/0155731 A1 * 6/2012 Weersink ................ G06T 7/344 382/128
2014/0268353 A1 * 9/2014 Fujimura ........... G02B 27/0101 359/630
2014/0362195 A1 * 12/2014 Ng-Thow-Hing ..... G06V 40/20 348/51
2016/0003636 A1 * 1/2016 Ng-Thow-Hing ... G01C 21/365 701/418
2016/0163048 A1 * 6/2016 Yee ........................ A61B 6/032 382/131
2016/0225180 A1 * 8/2016 Chang ..................... G06T 15/20
2018/0061069 A1 * 3/2018 Higaki ...................... G06T 7/50
2019/0141359 A1 5/2019 Taquet et al.
2019/0195616 A1 * 6/2019 Cao ....................... G06T 1/0014
2020/0045292 A1 * 2/2020 Boyce .................. H04N 13/178
2020/0228836 A1 * 7/2020 Schwarz .............. H04N 13/117
2020/0252647 A1 8/2020 Lasserre et al.
2020/0351484 A1 * 11/2020 Aflaki ....................... G06T 7/41
2020/0380765 A1 * 12/2020 Thudor ..................... G06T 9/00
2021/0112240 A1 * 4/2021 Aflaki .................. H04N 13/344
2021/0192796 A1 * 6/2021 Aflaki Beni .............. G06T 9/40
2022/0148251 A1 * 5/2022 Moloney ................ G01C 21/20
2022/0217400 A1 * 7/2022 Schwarz .............. H04N 19/597
2022/0262041 A1 * 8/2022 Salahieh ................ H04N 19/20
2023/0059516 A1 * 2/2023 Schwarz .............. H04N 19/179
2023/0239510 A1 * 7/2023 Sánchez De La Fuente ............... H04N 19/172 375/240.08

FOREIGN PATENT DOCUMENTS

CN 111095362 A 5/2020
CN 111615715 A 9/2020
EP 3429206 A1 1/2019
JP 2014071850 A 4/2014
WO WO-2018069412 A1 * 4/2018 ........... H04L 65/602
WO WO-2019034807 A1 * 2/2019 ............. G06T 15/04
WO 2019065587 A1 4/2019
WO 2019162567 A1 8/2019
WO 2020146547 A1 7/2020
WO WO-2020234373 A1 * 11/2020 ........... H04L 65/403

OTHER PUBLICATIONS

"2D Video Coding of Volumetric Video Data"—Schwarz et al., 978-1-5386-4160-6/18/$31.00 © 2018 IEEE. (Year: 2018).*

"Geometry-Guided 3D Data Interpolation for Projection-Based Dynamic Point Cloud Coding"—Sevom et al., 2018 7th European Workshop on Visual Information Processing (EUVIP). (Year: 2018).*

"Efficient 2D Video Coding of Volumetric Video Data"—Sheikhi-Pour et al., 2018 7th European Workshop on Visual Information Processing (EUVIP). (Year: 2018).*

L. Kondrad et al.: "[MIV] Discussion on new packed video sub-bitstream type", 130. MPEG Meeting; Apr. 20, 2020-Apr. 24, 2020; Alpbach; (Motion Picture Expert Group or ISO/IEC JTC1/SC29/WG11), No. m53125 Apr. 15, 2020 (Apr. 15, 2020), XP030286060 (4 pages).

S. Schwarz et al.,: "Emerging MPEG Standards for Point Cloud Compression", IEEE Journal on Emerging and Selected Topics in Circuits and Systems, IEEE, Piscataway, NJ, USA, vol. 9, No. 1 Mar. 11, 2019 (Mar. 11, 2019), pp. 133-148, XP011714044.

LG Electronics Inc: "XR Distributed Computing Architecture", 3GPP Draft; S4-190913, 3rd Generation Partnership Project (3GPP), Mobile Competence Centre ; 650, Route Des Lucioles ; F-06921 Sophia-Antipolis Cedex ; France, vol. SA WG4, No. Ljubljana,, Slovenia; Aug. 12, 2019-Aug. 16, 2019 Aug. 6, 2019 (Aug. 6, 2019), XP051757308,—Retrieved from the Internet: URL:http://www.3gpp.org/ftp/tsg_sa/WG4_CODEC/TSGS4_105_Ljubljana/Docs/S4-190913.zip—3 pages.

* cited by examiner 14
10
102
101
16

SIGNALING OF VISUAL CONTENT

CROSS-REFERENCE TO RELATED APPLICATIONS

This application is a continuation of copending International Application No. PCT/EP2021/076873, filed Sep. 29, 2021, which is incorporated herein by reference in its entirety, and additionally claims priority from European Application No. 20199471.2, filed Sep. 30, 2020, which is also incorporated herein by reference in its entirety.

TECHNICAL FIELD

Embodiments of the present disclosure relate to bitstreams for signaling visual contents, such as video bitstreams. Further embodiments relate to apparatuses for providing a bitstream, for example servers for providing visual content. Further embodiments relate to apparatuses for processing a bitstream, for example client devices for processing and/or presenting visual content. Further embodiments relate to methods for providing a bitstream and methods for processing a bitstream. Some embodiments of the invention are concerned with split rendering signaling.

BACKGROUND OF THE INVENTION

The recent advances of VR glasses and especially mixed reality (XR) glasses wherein real world surroundings of the users are overlaid with volumetric video objects or virtual objects have given rise to new media types being widely distributed and consumed referred to as volumetric video objects as depicted in FIG. 1 where a bitstream representing the volumetric video object is transmitted to a client for consumption. Such data can be represented in several ways, e.g. point clouds and 3D meshes. Point cloud consists of a large number of points in 3D space with color and further properties and together represent the objects. Alternatively, such volumetric video objects can also be represented as a textured 3D mesh.

Both representations of such virtual objects have two downsides in common when distribution and consumption are considered, which are, firstly, that a considerably large amount of data is necessary to store and transmit such virtual objects, and secondly, a considerable complexity is involved when rendering volumetric video objects for presentation on a user-side client device.

One approach to mitigate the above downsides in those scenarios is shifting the rendering off the client device and into the network, e.g. shifting it to an entity such as an edge-cloud server as depicted in FIG. 2. Such an edge-cloud server has a network link to the client device that introduces only a very small communication delay. Therefore, offloading the computationally complex task of rendering views of such virtual objects to such an edge cloud server can take stress of the end devices. On the edge cloud server, those rendered object views are subsequently encoded into a video and the coded video bitstreams are subsequently transmitted to the end device for presentation.

An object of the present invention is to provide a concept for transmitting visual content, which concept allows for an improved trade-off between a low data rate, a low effort on client-side processing, and a high information content on the visual content.

SUMMARY

According to an embodiment, a bitstream for signaling visual content may have: a representation of a picture, which represents a projection of a volumetric representation of an object onto a projection plane, which is positioned in a 3D space, from the perspective of a view position in the 3D space, and a geometric representation of the projection plane in the 3D space.

Another embodiment may have an apparatus for providing a bitstream, configured to obtain a picture, which represents a projection of a volumetric representation of an object onto a projection plane, which is positioned in a 3D space, from the perspective of a view position in the 3D space, and provide, in the bitstream, a representation of the picture and a geometric representation of the projection plane in the 3D space.

Another embodiment may have an apparatus for processing a bitstream, configured to retrieve, from the bitstream, a representation of a picture, which represents a projection of a volumetric representation of an object onto a projection plane, which is positioned in a 3D space, from the perspective of a view position in the 3D space, and a geometric representation of the projection plane in the 3D space.

According to another embodiment, a method for providing a bitstream may have the steps of: obtain a picture, which represents a projection of a volumetric representation of an object onto a projection plane, which is positioned in a 3D space, from the perspective of a view position in the 3D space, and provide, in a bitstream, a representation of the picture and a geometric representation of the projection plane in the 3D space.

Another embodiment may have a method for processing a bitstream, having retrieving, from the bitstream, a representation of a picture, which represents a projection of a volumetric representation of an object onto a projection plane, which is positioned in a 3D space, from the perspective of a view position in the 3D space, and a geometric representation of the projection plane in the 3D space.

Another embodiment may have a non-transitory digital storage medium having stored thereon a computer program for performing a method for providing a bitstream, having the steps of: obtaining a picture, which represents a projection of a volumetric representation of an object onto a projection plane, which is positioned in a 3D space, from the perspective of a view position in the 3D space, and providing, in a bitstream, a representation of the picture and a geometric representation of the projection plane in the 3D space, when said computer program is run by a computer.

Another embodiment may have a non-transitory digital storage medium having stored thereon a computer program for performing a method for processing a bitstream, having retrieving, from the bitstream, a representation of a picture, which represents a projection of a volumetric representation of an object onto a projection plane, which is positioned in a 3D space, from the perspective of a view position in the 3D space, and a geometric representation of the projection plane in the 3D space, when said computer program is run by a computer.

A first aspect of the present invention relies on the idea to project a volumetric representation of an object onto a projection plane positioned in 3D space, and to transmit in a bitstream, in addition to a picture representing the projection, a geometric representation of the projection plane. Representing the object by a perspective projection onto a plane in the 3D space in combination with signaling the geometric representation of the projection plane allows an apparatus for processing the bitstream to rely on geometric information when integrating the transmitted picture of the object into a 3D scene. Thus, when rendering a picture of the 3D scene with the object, a movement of a user perspective or a user position, from which the 3D scene is to be rendered, may be accounted for in the presentation of the transmitted picture of the object. This way, aberrations may be reduced or avoided, so that the user may experience the rendered picture more realistic. Also, the availability of the geometric representation to a client device may enable the client device to consider interactions of the object represented by the transmitted picture and further objects within the 3D scene more precisely, for example occlusions. In particular, using a plane-projection provides a good trade-off between a low amount of data needed for signaling the geometric representation, and a beneficial amount of information allowing to treat said effects like aberrations and occlusions. Thus, an integration of the signaled picture of the object into a 3D scene may profit from geometric or spatial information without a need to transmit a volumetric representation of the object. This way, the amount of transmitted data may be reduced, and the effort for rendering a volumetric representation may be avoided on client-side.

Embodiments according to the first aspect provide a bitstream for signaling visual content. The bitstream comprises a representation of a picture. For example, the representation may include a texture map and/or further maps. The picture represents a projection of a volumetric representation of an object onto a projection plane. For example, the volumetric representation comprises a point cloud representation or a mesh representation of the object. The projection plane is positioned in a 3D space, e.g. a 3D space in which the object is positioned. The projection of the volumetric representation of the object onto the projection plane is from the perspective of a view position in the 3D space. For example, the 3D space may be thought as containing the object, the projection plane and the view position. In other words, the view position might in examples be thought of as defining the origin of the 3D space. In some examples, the projection onto the projection plane may be a plane projection along the plane's normal through the view position. The bitstream further comprises a geometric representation of the projection plane in the 3D space.

According to embodiments, the geometric representation is indicative of a position and/or an orientation of the projection plane in the 3D space. Having such information may enable a client device to account for a deviation of a current user position from the view position from which the projection of the object is performed, for example by warping the picture. Also, such information may enable a client device to determine occlusions of the picture, or by the picture, with respect to further objects in a 3D scene into which the picture may be integrated.

Further embodiments of the first aspect provide an apparatus and a method for providing a bitstream, e.g. a video bitstream. The method comprises obtaining, e.g. receiving or deriving, a picture, which represents a projection of a volumetric representation, e.g. a point cloud representation or a mesh representation, of an object onto a projection plane, which is positioned in a 3D space, from the perspective of a view position in the 3D space. The method further comprises providing, in the bitstream, a representation of the picture and a geometric representation of the projection plane in the 3D space. The apparatus is configured for performing the steps of the method.

Further embodiments of the first aspect provide an apparatus and a method for processing a bitstream, e.g. a video bitstream. The method comprises retrieving, from the bitstream, a representation of a picture, which represents a projection of a volumetric representation, e.g. a point cloud representation or a mesh representation, of an object onto a projection plane, which is positioned in a 3D space, from the perspective of a view position in the 3D space The method further comprises retrieving, from the bitstream, a geometric representation of the projection plane in the 3D space. The apparatus is configured for performing the steps of the method.

A second aspect of the present invention relies on the idea of signaling, in a bitstream, a composed picture comprising a number of pictures, the pictures representing projections of a number of respective objects onto a number of respective projection areas. The idea of signaling projections of a number of one or more objects in a composed picture structure provides the advantage of an efficient packing and handling of the projections for a flexible number of objects. For example, the composed picture may be handled as a picture of a specific time frame, so that, e.g. in scenarios, in which the objects and/or the projection planes may move, a sequence of projections is to be provided in the bitstream. The composed picture may allow for an association of projections of the number of objection with a common time frame, and thus, for a joint handling, e.g. in a decision of whether to use or to ignore projections of a specific time frame. More generally, signaling the projections of the number of objects in a composed picture may reduce the signaling overhead by providing the possibility of signaling information required for decoding the pictures, which information refers to all of the pictures, on the level of the composed picture. Consequently, signaling representations of the number of objects in a composed picture may allow to implement the bitstream as a video bitstream, so that the efficiency of video codecs may be exploited for a transmission of rendered projections of volumetric representations, e.g. from a server to a client.

Embodiments according to the second aspect provide a bitstream, e.g. a video bitstream, for signaling visual content. The bitstream comprises a representation of a composed picture, the composed picture comprising a number of pictures, e.g. one or multiple pictures. For example, the composed picture may provide a structure for signaling a number of one or more pictures. Each of the pictures is represented by one or more regions of the composed picture. The pictures represent projections of a number of corresponding volumetric representations, e.g. a point cloud representation or a mesh representation, of a number of respective objects, onto a number of respective projection areas. For example, each of the pictures may represent a projection of a respective volumetric representation onto a respective projection area, the respective volumetric representation representing a respective object. The projections onto the respective projection areas may be projections from the perspective of a view position, e.g. a common view position. In examples, the projection areas may be planes or curved areas. The bitstream further comprises a region projection indication which associates one of the regions of the composed picture with one of the pictures.

Further embodiments according to the second aspect provide an apparatus and a method for providing a bitstream, e.g. a video bitstream. The method comprises obtaining, e.g. receive or derive, a composed picture, the composed picture comprising a number of pictures. Each of the pictures is represented by one or more regions of the composed picture. The pictures represent projections of a number of corresponding volumetric representations, e.g. a point cloud representation or a mesh representation, of a number of respective objects onto a number of respective projection areas. The method further comprises providing, in the bitstream, a representation of the composed picture and a region projection indication which associates one of the regions of the composed picture with one of the pictures. The apparatus is configured for performing the steps of the method.

Further embodiments according to the second aspect provide an apparatus and a method for processing a bitstream, e.g. a video bitstream. The method comprises retrieving, from the bitstream, a representation of a composed picture comprising a number of pictures. Each of the pictures is represented by one or more regions of the composed picture. The pictures represent projections of a number of corresponding volumetric representations, e.g. a point cloud representation or a mesh representation, of a number of respective objects onto a number of respective projection areas. The method further comprises retrieving, from the bitstream, a region projection indication which associates one of the regions of the composed picture with one of the pictures. The apparatus is configured for performing the steps of the method.

A third aspect of the present invention relies on the idea of signaling a number of information types for a picture within a composed picture, so that one of a number of regions is indicative of a number of samples for one of the information types for the picture. Signaling a number of information types in the composed picture provides an efficient way of transmitting a flexible number of information types for a picture. For example, the picture may include one or more numbers of samples for each of the number of information types, which may, for example include one or more of a texture map, e.g. chroma and/or luma channel, a depth map, a transparency mask, a reflectance map, and a reflectance map. Using a composed picture structure may reduce the signaling overhead as compared with signaling individual pictures, as information referring to the pictures as entity may be signaled on the level of the composed picture. Further, a flexible number of information types may be signaled without changing the number of composed pictures, such keeping the structure of the bitstream simple and/or allowing to integrate the signaling a flexible number of information types using video streaming codecs such as, for example, AVC, HEVC, or VVC.

Embodiments according to the third aspect provide a bitstream, e.g. a video bitstream, for signaling visual content. The bitstream comprises a representation of a composed picture comprising a number of regions. The composed picture is indicative of a picture which comprises, for samples of the picture, respective numbers of sample values for a number of information types. The bitstream further comprises a region type indication which associates one of the regions of the composed image with one of the information types.

Further embodiments according to the third aspect provide an apparatus and a method for providing a bitstream, e.g. a video bitstream. The method comprises obtaining, e.g. receiving or deriving, a composed picture, the composed picture comprising a number of regions. The composed picture is indicative of a picture which comprises, for samples of the picture, respective numbers of sample values for a number of information types. The method further comprises providing, in a bitstream, a representation of the composed picture and a region type indication which associates one of the regions of the composed image with one of the information types. The apparatus is configured for performing the steps of the method.

Further embodiments according to the third aspect provide an apparatus and a method for processing a bitstream, e.g. a video bitstream. The method comprises retrieving, from the bitstream, a representation of a composed picture comprising a number of regions. The composed picture is indicative of a picture which comprises, for samples of the picture, respective numbers of sample values for a number of information types. The method further comprises a region type indication which associates one of the regions of the composed image with one of the information types. The apparatus is configured for performing the steps of the method.

Further embodiments of the invention combine two or all of the first, the second, and the third aspect.

BRIEF DESCRIPTION OF THE DRAWINGS

Embodiments of the present invention are described in more detail below with respect to the figures, among which.

DETAILED DESCRIPTION OF THE INVENTION

In the following, embodiments are discussed in detail, however, it should be appreciated that the embodiments provide many applicable concepts that can be embodied in a wide variety of coding of visual content. The specific embodiments discussed are merely illustrative of specific ways to implement and use the present concept, and do not limit the scope of the embodiments. In the following description, a plurality of details is set forth to provide a more thorough explanation of embodiments of the disclosure. However, it will be apparent to one skilled in the art that other embodiments may be practiced without these specific details. In other instances, well-known structures and devices are shown in form of a block diagram rather than in detail in order to avoid obscuring examples described herein. In addition, features of the different embodiments described herein may be combined with each other, unless specifically noted otherwise.

In the following description of embodiments, same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different embodiments.

Figure 1:
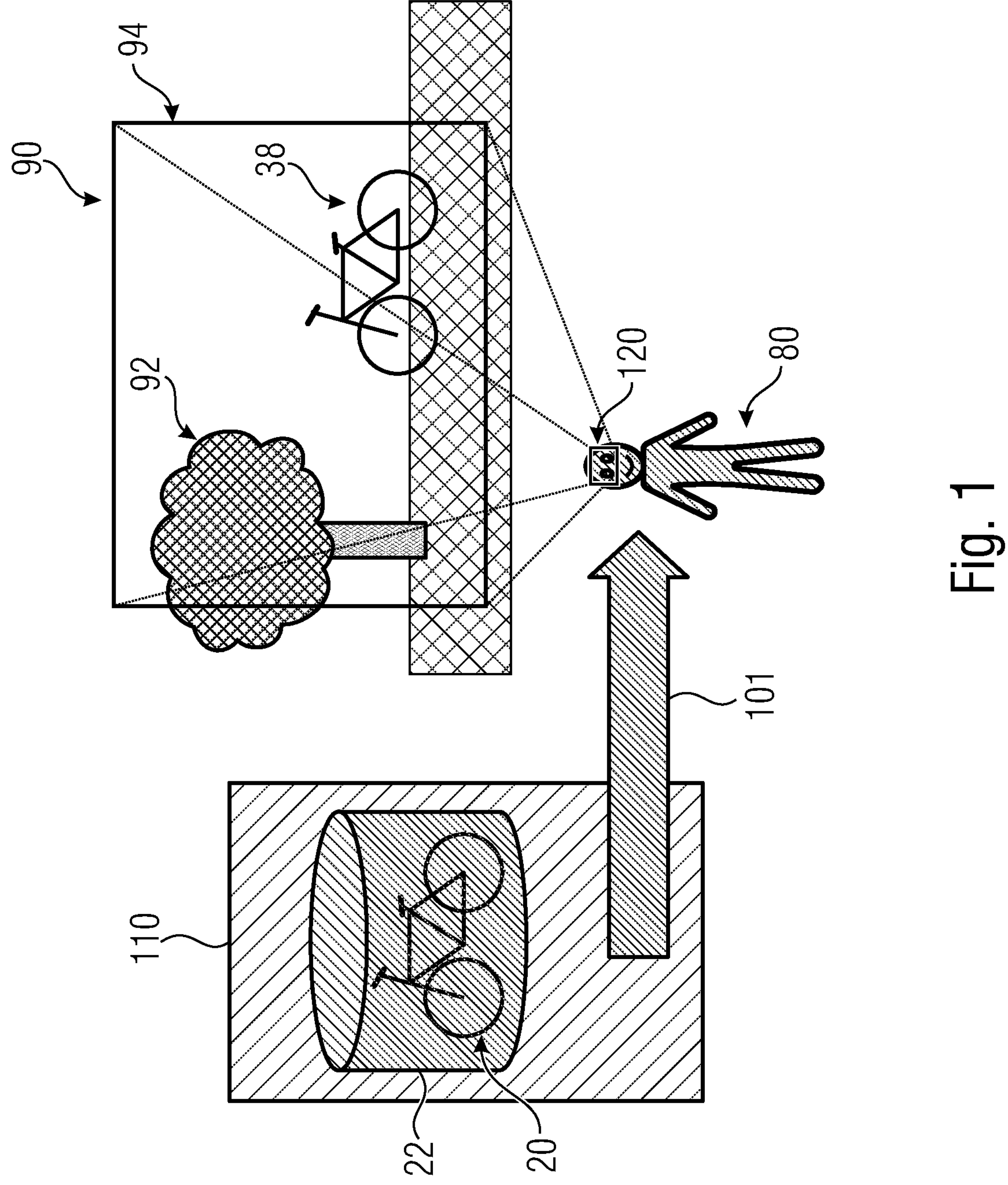
FIG. 1 illustrates an example of an application scenario of embodiments.

FIG. 1 illustrates an example of an application scenario of the present invention, in which a volumetric video object 20 is placed in a user view 94 of a user 80, the user view 94 being a view of a real world surrounding 90, which may include a background and real world scene objects 92. To this end, the user may wear XR glasses 120, which may overlay the user's view with a rendered representation 38 of the volumetric video object 20. The XR glasses may be provided with the rendered representation 38 by a client device connected to edge cloud server 110. The user view 94 may also be referred to as user viewport 94. Edge cloud server 110 may have stored a volumetric representation 22 of the video object 20. Edge cloud server 110 provides a bitstream 101 which is indicative of the video object 20, and the client device may obtain the rendered representation 38 on the basis of the bitstream 101. As described in the introductory part, conventionally, the bitstream 101 includes the volumetric representation 22, so that the client device needs to render the volumetric representation so as to derive the rendered representation 38. In other words, the bitstream 101 may transmit a volumetric video object.

Figure 2:
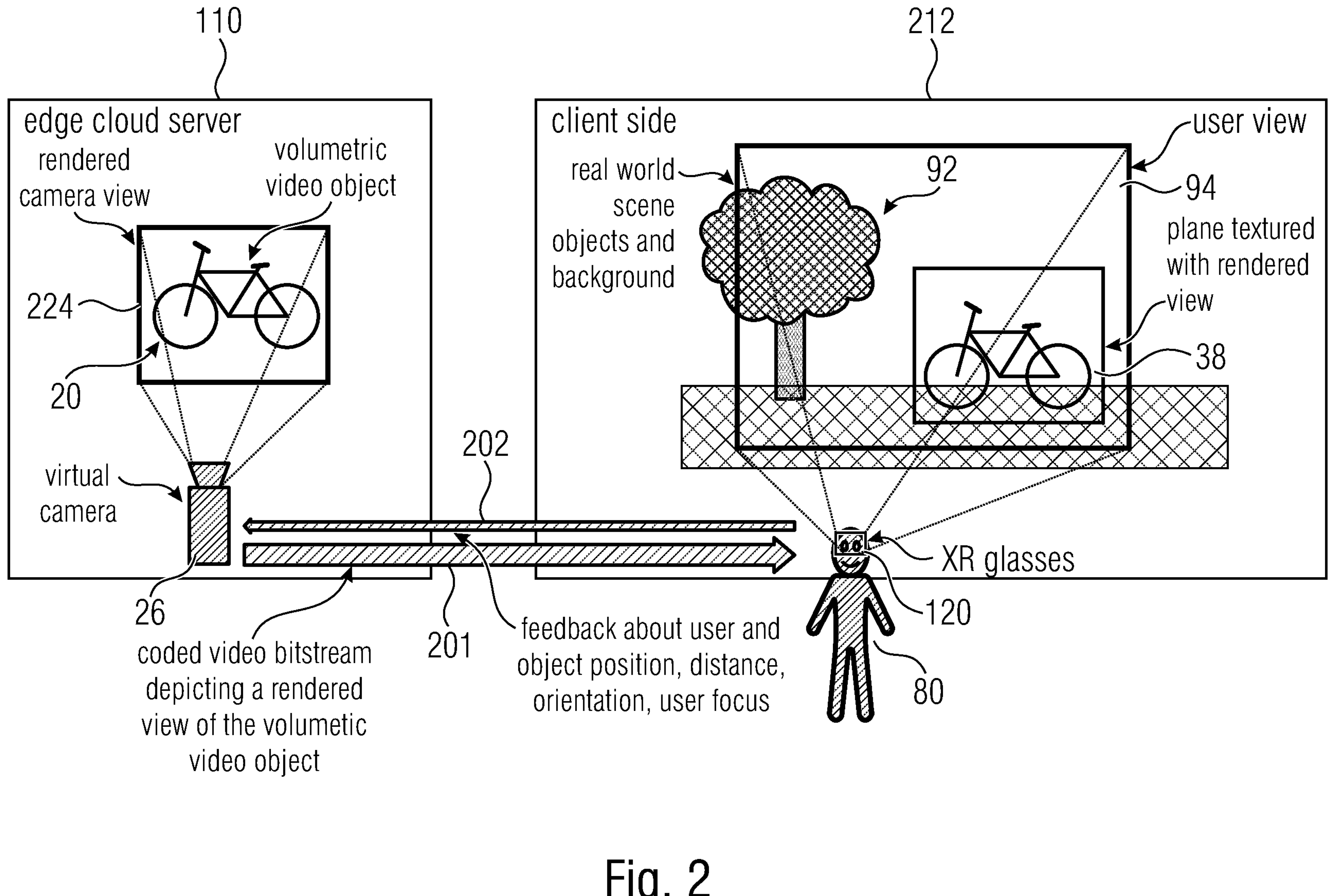
FIG. 2 illustrates an exemplary implementation framework for embodiments.

FIG. 2 illustrates an exemplary implementation framework for the present invention in the context of the scenario illustrated in FIG. 1. According to the implementation of FIG. 2, the volumetric video object 20 is rendered by edge cloud server 110. To this end, edge cloud server 110 renders the object 20 from the perspective of a virtual camera 26, so as to obtain a rendered view 224 of the object 20. Instead of transmitting the entire volumetric representation, edge cloud server 110 may transmit the rendered view 224 in a coded video bitstream 201. For the rendering of the volumetric object 20, edge cloud server 110 may consider client-side information 202 such as information about a position of the user 80 in the real world scene 90, a position of the object 20 in the real world scene, a distance between user 80 and object 20, and a user focus. The client side information 202 may be provided by client device 212, which is to process the bitstream 201, and to provide the rendered representation 38 to the XR glasses 120. For example, the rendered representation 38 may be provided as a plane textured with the rendered view 224, which plane may be placed within the user view 94 according to a position for the object 20 in the real world scene 90. Accordingly, in the implementation illustrated in FIG. 2, a rendered view, i.e. a picture representation, of the object 20 is transmitted in bitstream 201. Thus, a video codec may be employed for coding the rendered view 224 into the bitstream 201, which may accordingly be formatted as video bitstream.

Processing such coded video bitstream on the end device is typically much less resource-consuming as end devices are likely equipped with dedicated power-efficient hardware for video decoding. Also, the high coding efficiency of latest generation video codecs can be applied to reduce the necessary transmission bitrate considerably compared to the bitrate of point cloud of mesh representations. It should also be noted that when transmitting the volumetric video data in the original format, e.g. mesh or point cloud, a lot of data is transmitted that is ultimately not presented to the user, e.g. due to occlusions when viewing the objection from a single viewpoint. Transmitting only the user view of an object can therefore omit sending the unused information that to the client, much like it is done in viewport dependent streaming of 360-degree video.

The rendered view may be accompanied with further auxiliary information such as an alpha or transparency mask, translucency mask, depth map or further material information to assist rendering, i.e. help towards a more realistic presentation, on client side, e.g. removing the background of the rendered object or create additional light or reflection effects for proper integration into the scene as seen by the user. Newest XR headsets may even be equipped with sensors to capture eye movement and focus points in the scene to reconstruct a depth of field of the spectator, i.e. objects may appear crisp or blurred depending on the focus of the spectator. Such system would require that the coded video bitstream are the composite of multiple forms of information. Such systems may even combine information from multiple objects into a single bitstream. For instance, when system design and server resources allow, such a combination could be the result of joint rendering of objects on the same cloud server instance.

However, it is required that this composite of information can be put apart into individual pieces on client side. It is also desirable that such a video bitstream being send from server to client in these systems is self-contained and can be re-used when consumed outside of the original application, at a different time or on different non-XR devices. Having a self-contained bitstream format can also serve to design XR system more efficiently using the provided information within the bitstream instead of duplicating such information on a separate control channel which is asserted to be beneficial. Hence, current state-of-the-art systems miss video bitstream signalling to solve the issues of such cloud-server based rendering systems for volumetric video. In particular, it needs to be possible to identify which type of an areas are present within a bitstream and how to process them, e.g.:

1) What areas are distinct in the coded picture and where in the picture plane are they spatially and temporally
2) Whether (some) samples of the areas are intended for direct presentation (rendered textured view) or whether they are intended for subsequent processing (alpha, depth) of the rendered texture view.
3) How to recreate objects in 3D space when consumed in an XR scenario Several techniques exist in this place which are closely related. For instance, for projected 360-degree video (even with less than 360 degree coverage), bitstream signalling exists in AVC, HEVC and VVC in the form of projection SEI messages (cubemap, equirectangular SEI messages) as well as a packing format description through Region-wise packing that maps decoded samples to the projected image. However, these methods are lacking to indicate the proper projection characteristics as well as failing to properly describe some of the further attributes associated to volumetric content (or rendered views) such as alpha, depth or material information.

Figure 3:
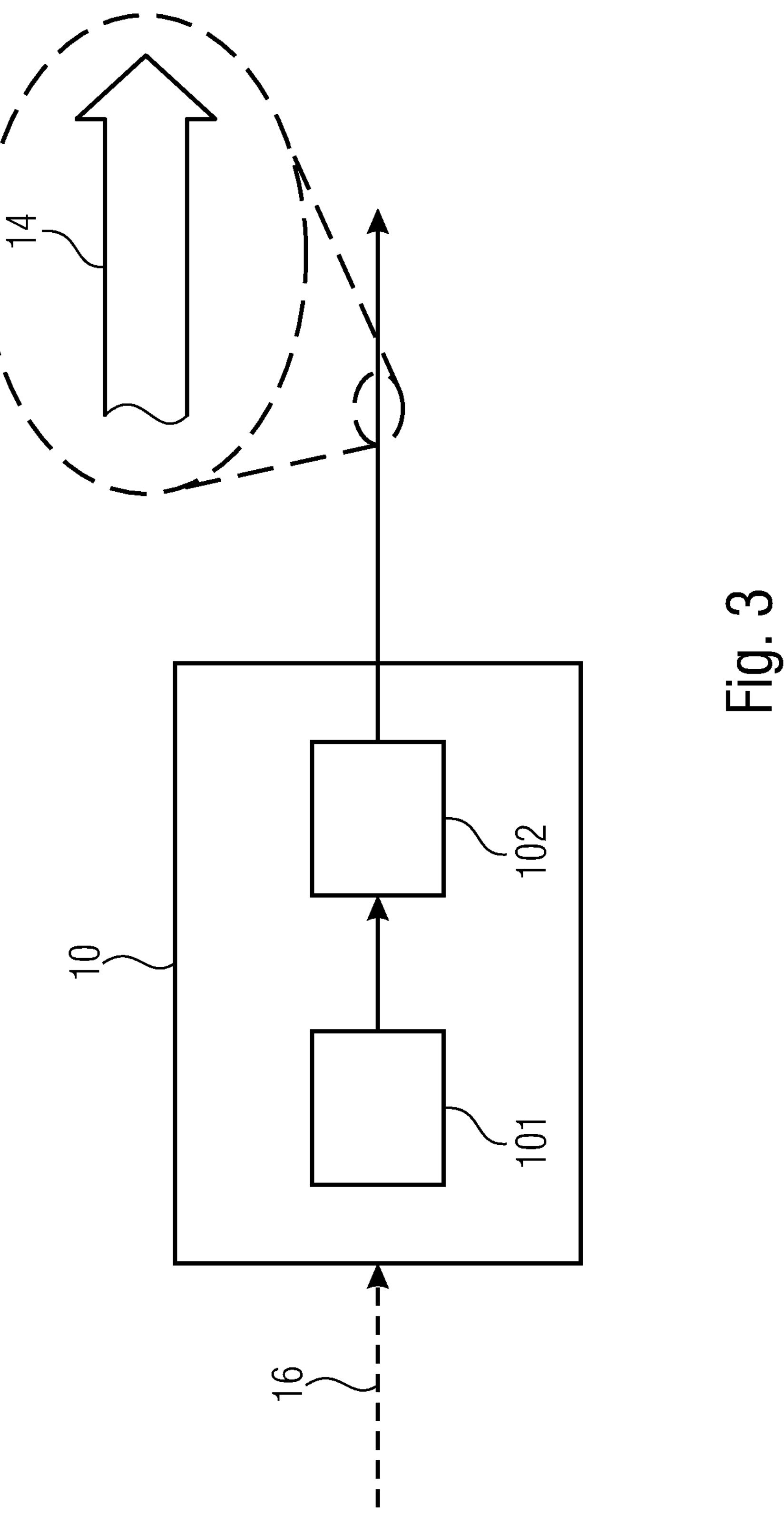
FIG. 3 illustrates an apparatus for providing a bitstream according to an embodiment.
Figure 4:
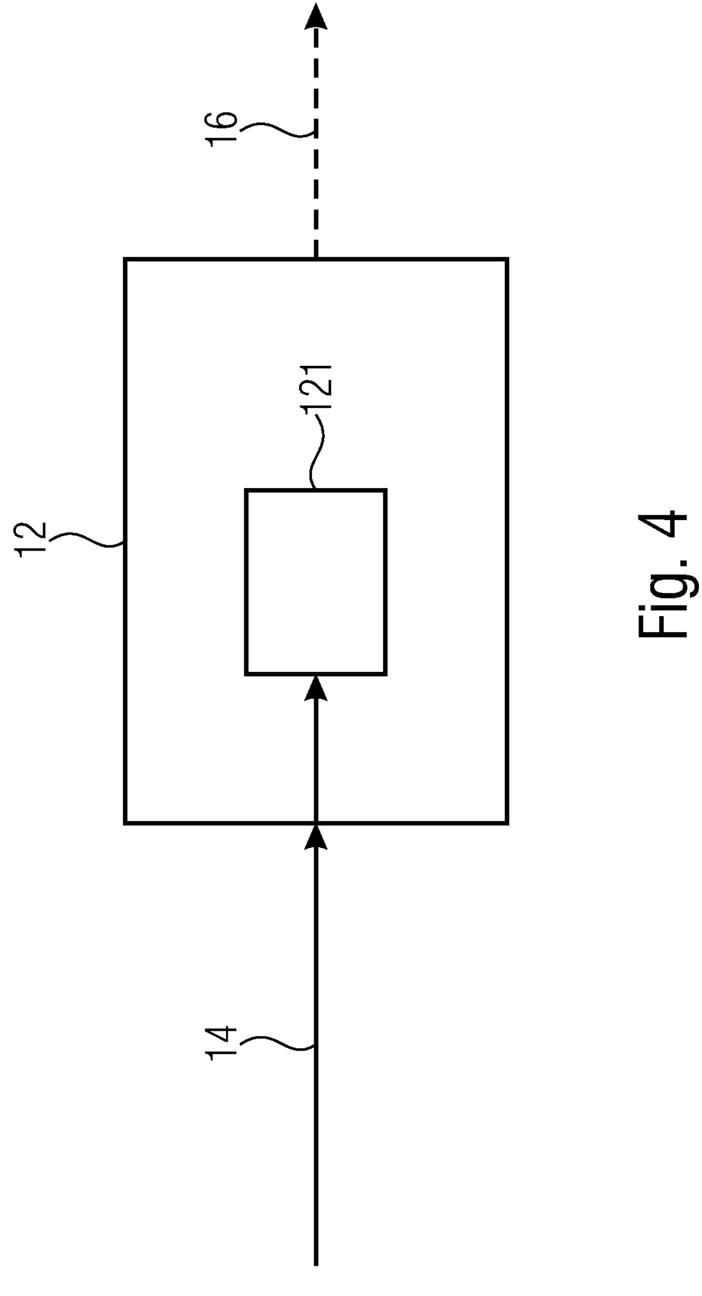
FIG. 4 illustrates an apparatus for processing a bitstream according to an embodiment.

FIG. 3 illustrates an apparatus 10 according to an embodiment. Apparatus 10 is configured for providing a bitstream 14. FIG. 4 illustrates an apparatus 12 according to a further embodiment. Apparatus 12 is configured for processing the bitstream 14. Apparatus 10, apparatus 12, and bitstream 14 of FIG. 3 and FIG. 4 are to be understood as a framework, within which embodiments may be implemented. It is noted, that bitstream 14 processed by apparatus 12 as shown in FIG. 4 may correspond to bitstream 14 provided by apparatus 10 as illustrated in FIG. 3, however, this is not necessarily the case. For example, a further apparatus may adapt the bitstream provided by apparatus 10 or select parts of the bitstream provided by apparatus 10 so as to provide the bitstream to be processed by apparatus 12. In other words, the bitstream 14 of FIG. 4 may be based on bitstream 14 of FIG. 3, or may correspond to same.

According to embodiments, the bitstream 14 is a video bitstream. For example, bitstream 14 may comply with a video codec such as AVC, HEVC, or VVC.

For example, apparatus 10 may be a server, e.g. an edge cloud server, e.g. edge cloud server 110 of FIG. 1 or 2, or may be part of a server, or may be connected to a server. For example, apparatus 10 may run a server application. Apparatus 10 may include, or have access to, data of visual content, and may provide a representation of the visual content in the bitstream 14. To this end, apparatus 10 may comprise an encoder for encoding visual content into the bitstream 14.

For example, apparatus 12 may be a client device, or part of a client device, or may be connected to a client device. Apparatus 12 receives the bitstream 14. In examples, apparatus 12 may include a decoder for decoding visual content from the bitstream. Apparatus 12 may provide the visual content to a further device for rendering the visual content and/or for presenting the visual content to a user. In this respect, apparatus 12 may be part of a user equipment.

Figure 5:
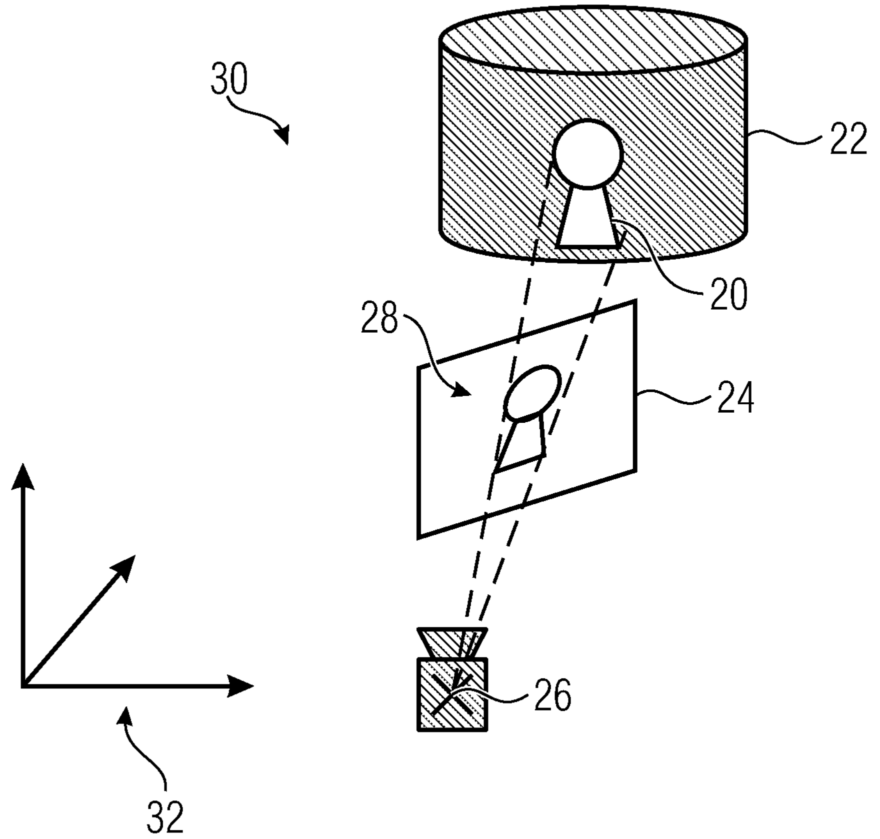
FIG. 5 illustrates a projection of an object according to an embodiment.

FIG. 5 illustrates a projection of an object according to an embodiment, as it may, for example, be transmitted from apparatus 10 to apparatus 12 in bitstream 14. As illustrated in FIG. 5, a volumetric representation 22 of an object 20 may be projected onto a projection area 24 from the perspective of a view position 26, so as to obtain a projection 28 of the object 20. To this end, the projection area 24 may be positioned in a 3D space 30, in which the object 20 and the view position 26 are positioned, e.g. as described with respect to FIG. 3 and FIG. 4. In some embodiments, e.g. according to the first aspect of the invention, the projection area 24 is a plane. In further embodiments, e.g. according to the second and third aspects, the projection area 24 is not necessarily a plane, but may alternatively be a curved surface.

The projection may be performed from the perspective of a view position 26. The view position 26 used for projecting the volumetric representation 22 may be chosen in dependence on a user position in a 3D scene, e.g. a real world scene. To this end, apparatus 12 may provide information 16 about a perspective of a user, e.g. a user of a user application to which apparatus 12 may provide the visual content retrieved from bitstream 14. The information 16 may, for example, include one or more of a user position, and a user viewing direction.

For example, the apparatus 12 for processing the bitstream, e.g. a client device running a user application, may provide a user position and/or a user viewing direction in a user 3D space (in which the user is located either virtually or really) to the apparatus 10 for providing the bitstream, e.g. a server for providing visual content (e.g. representations or views of one or more virtual objects, or a virtual world scenario). In other words, the user 3D space may describe the real world or may describe a virtual world presented to the user.

For example, a user application on the client device may be for presenting, to the user, a mix of real world background and virtual objects. Virtual objects may be placed freely by the user in his real world scene, but they can also move around the real world scene driven by content animation (e.g. walking character). In other words, the user application may place the object 20 in the real world view 94 of the user 80, e.g. based on a user interaction or based on scenarios created by the application. In examples one or both of the object 20 and the user 80 may move in the user world (real or virtual) 90. For example, the user application or client may provide, to the server 12, an information 16 about a position of the object in the user 3D space, e.g. relative to a user position and/or user viewing direction, or absolute with respect to a coordinate system of the user 3D space. Alternatively or additionally, the virtual object 20 may be placed in the user world 90 based on server side knowledge of the real world scene (e.g. place character on the real world ground). For example, the server side knowledge of the real world scene may be based on the user position and/or the user viewing direction, provided by the user application or client 12 to the server 10. For example, the server may have access to a 3D model of the (virtual or real) world 90, in which the user 80 is located. The projection 224 may be obtained using the view position/direction 26 and the position of the object (which may be determined from the 3D model of the world).

The user position and/or projection viewing direction in a 3D space of the user may be described by means of a coordinate system 32, e.g. Cartesian coordinates and yaw/pitch, respectively. For example, the user position and/or user viewing direction may represent a position/view of the user in a virtual world. In other examples, the user position and/or viewing point may represent a position/view of the user in the real world. The apparatus for providing the bitstream, e.g. server device, may apply the user positon and/or user viewing direction, or an adapted version thereof (e.g. adapted according to a predicted movement of the user in the 3D space) as a view position and/or projection viewing direction, respectively, for projecting the object onto the projection plane 24 (or projection area 24).

In other words, the view position used for projecting the object onto the projection plane may for example represent the user position, or an assumed/predicted user position, or a position from which a view on the object is to be determined, in the 3D space of the server application or server side. A projection (or perspective) viewing direction may accordingly represent the user viewing direction on the server side. The view position may be referred to as a camera position or camera viewing position, e.g. of a virtual camera capturing the picture of the projection of the object. Similarly, the projection (or perspective) viewing direction may be referred to as a camera viewing direction, which may be described by a projection/camera viewing center vector or normal vector. For example, the user viewing direction, from which the perspective viewing direction may be derived, may be a normal vector to a view of the user, e.g. referred to as user normal vector.

The coordinate systems of the 3D space of the user and the 3D space in which the object is positioned, e.g. the 3D space of the server side, may be equivalent, or may be different (in the latter case transformation information may be transmitted in either or both directions between the server and client sides). For example, the coordinate system of the user 3D space may be centered at the position of the user in the user 3D space, and may move with the user. Optionally, the coordinate system may also move (rotate) with the user viewing direction.

Figure 6:
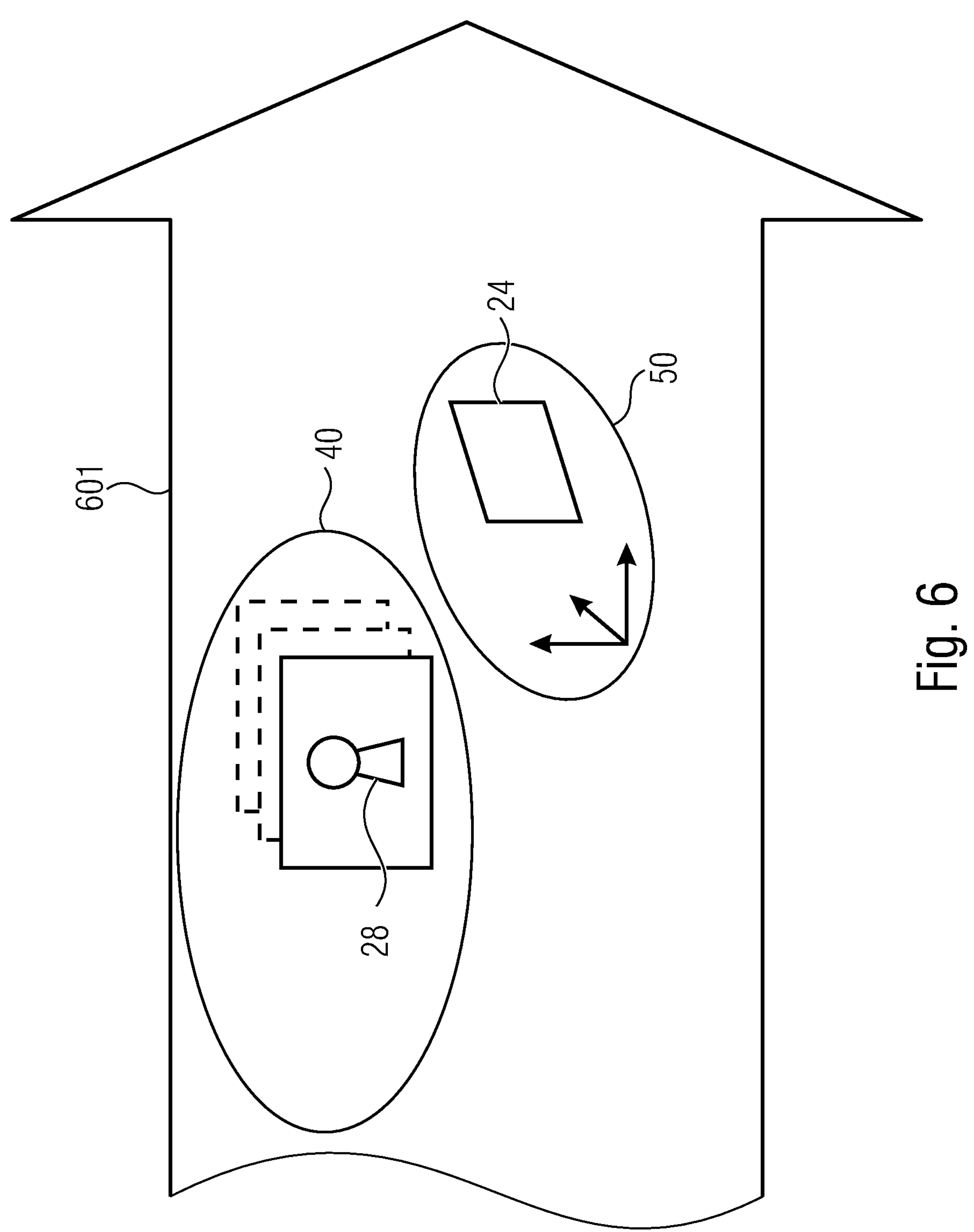
FIG. 6 illustrates a bitstream according to an embodiment of the first aspect.

FIG. 6 illustrates a bitstream 601 according to an embodiment of the first aspect. The bitstream 601 may optionally be an example of the bitstream 14. Bitstream 601 comprises a representation 40 of a picture which represents a projection 28 of a volumetric representation 22 of an object 20 onto a projection plane 24. The projection plane is positioned in 3D space. The projection 28 onto the plane 24 is performed from the perspective of a view position 26. Thus, according to embodiments of the first aspect, the projection 28 signaled in the bitstream 601 is a projection onto a plane. The bitstream 601 further comprises a geometric representation 50 of the projection plane 24 in the 3D space 30, e.g. as illustrated in FIG. 5. For example, the geometric representation 50 is indicative of a relative position of the view position 26 with respect to the projection plane 24.

An advantage of using a plane as projection area 24 is, that the projection 28 of the object 20 may depend on the user position, and consequently on the view position 26, but may be independent from the viewing direction 82. Consequently, a change of the user viewing direction does not necessarily require a new rendering of the object 20 on server side.

According to embodiments, the geometric representation is indicative of a position of the projection plane 24 in the 3D space 30. For example, the position may be indicated in terms of an absolute position in the 3D space 30, wherein the coordinate system 32 of the 3D space may be common with a coordinate system of a 3D space of an apparatus for processing the bitstream, e.g. a coordinate system of the 3D scene 90 in which the user of a user application is moving. Alternatively, the position of the projection plane 24 may be indicated in terms of a relative position with respect to the view position 26. Alternatively or additionally, the geometric representation 50 may be indicative of an orientation of the projection plane 24 in the 3D space 30. For example, the orientation may be indicated in terms of an absolute orientation with respect to the coordinate system of the 3D space, or in terms of a relative orientation, e.g. with respect to a perspective viewing direction or with respect to a plane perpendicular to the perspective viewing direction.

According to embodiments, the geometric representation 50 may indicate the position and/or the orientation of the projection plane with respect to a view position. For example, the projection plane may be indicated in terms of relative coordinates with respect to the view position 26, the coordinates referring to the coordinate system 32.

For example, the geometric representation 50 comprises coefficients of a plane equation describing the position and the orientation of the projection plane 24. For example, the geometric representation 50 may comprise at least four coefficients a, b, c, d for the general form of the plane equation $ax+by+cz+d=0$, see, for example, embodiment b) described with respect to Table 2 below. In this case, the origin of the coordinate system may, in examples, be chosen as the view position 26, so that the plane equation defines the plane 24 relative to the view position.

According to embodiments, the geometric representation 28 indicates the position and/or the orientation of the projection plane 24 with respect to absolute coordinates of the 3D space 30, and the view position 26 is represented by absolute coordinates of the 3D space 30.

For example, the geometric representation 50 comprises coefficients of a plane equation describing the position and the orientation of the projection plane 24, and the coefficients further describe coordinates of an origin of the coordinate system 32, to which the plane equation refers. In the latter examples, the geometric representation may comprise, for example, at least six coefficients, e.g. for a plane equation of the form $a(x-x_0)+b(y-y_0)+c(z-z_0)=0$, wherein $x_0$, $y_0$ and $z_0$ may describe the origin of the coordinate system, see, for example, embodiment c) described with respect to Table 2 below.

Figure 7:
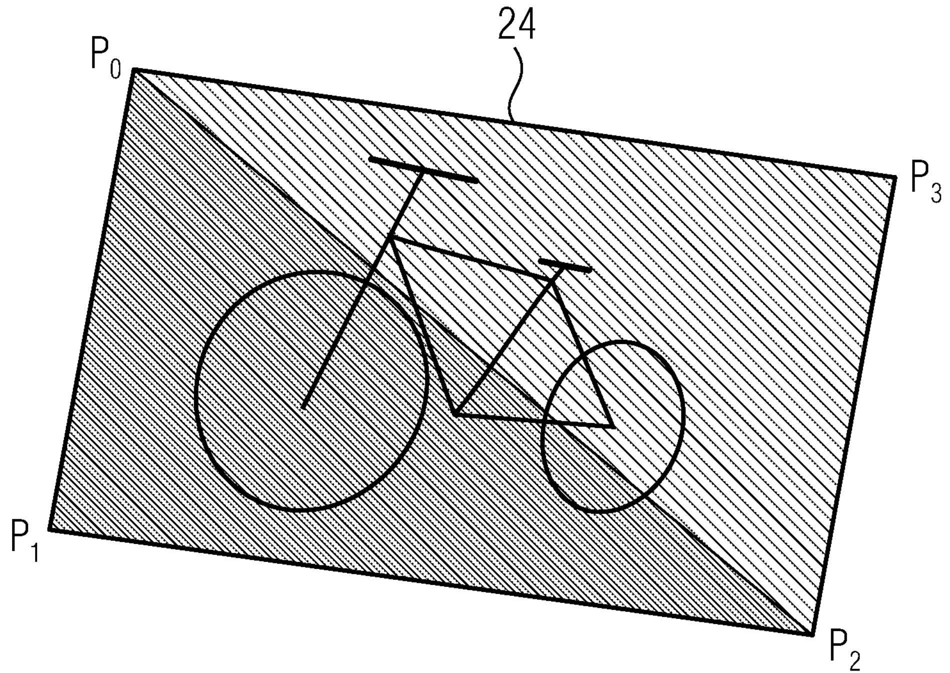
FIG. 7 illustrates an example of the geometric representation indicating three vertices.

FIG. 7 illustrates a geometric representation of the projection plane 24 according to an embodiment, according to which the geometric representation 50 is indicative of at least three points in the 3D space 30, e.g. three points lying in the projection plane 24. E.g., the three points may define vertices of a rectangular projection plane, e.g. $P_0$, $P_1$, and $P_2$ in FIG. 7. The fourth vertex $P_3$ may be derived by mirroring $P_1$, so that is does not need to be signaled.

In other words, in one embodiment, instead of providing a plane equation with horizontal and vertical dimension, vertices of the plane are provided in the perspective projection SEI message, e.g. three points $P_0$ to $P_2$ where $P_n=(x_n, y_n, z_n)$ in order to define a polygon as shown in FIG. 7. The forth point $P_3$ can be derived through mirroring $P_1$ on the axis $P_0P_2$ or be explicitly signalled. Such a representation of the plane may be easier to process in the client side rendering as polygons can be reconstructed straight away from the points serving as vertices. Such an approach also has no constraints of plane placement or position.

Figure 8:
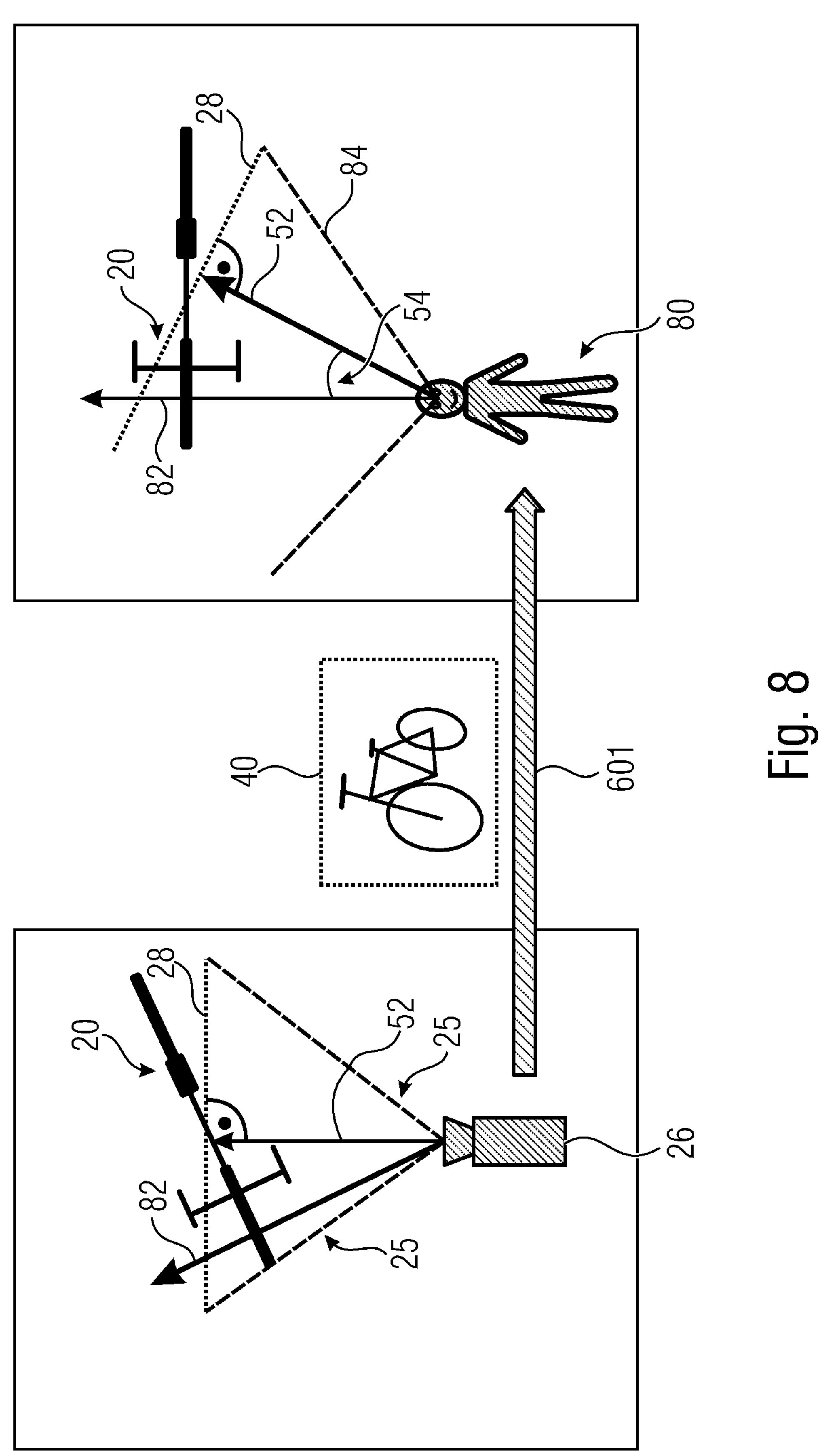
FIG. 8 illustrates another example of the geometric representation of the projection plane.

FIG. 8 illustrates an example of the geometric representation 50 of the projection plane 28 according to another embodiment. The geometric representation 50 may indicate the position and/or the orientation of the projection plane 24 with respect to the perspective viewing direction 82. For example, the projection plane 24 may be indicated by means of a vector pointing from the view position 26 to the plane 24, e.g. the center or an edge of the plane 24. The direction of the vector 52 may be defined relative to the perspective viewing direction 82, and the length of the vector 52 may define a distance between the view position 26 and the projection plane 24. In the description of FIG. 8, it is assumed for simplicity, that the user viewing direction and the perspective viewing direction on server-side are identical, however, as described before, a coordinate transformation may be employed and/or an offset, e.g. a temporal offset, may be considered.

According to an example of FIG. 8, the projection plane 28 is perpendicular to vector 52 between the view position 26 and the projection plane 24, which is in FIG. 8 indicated by the projection 28 projected onto the projection plane 24.

Accordingly, the geometric representation 50 may be indicative of a distance between the view position 26 and the projection plane 24, e.g. defining the length of vector 52.

Vector 52 may, for example, point to a specific point of the projection plane 24, such as the center or a vertex or corner. In the example of FIG. 8, where the projection plane is oriented perpendicular to the vector 52, a low number of parameters may be sufficient for signaling the geometric representation 50.

As illustrated in FIG. 8, the geometric representation 50 may be indicative of an orientation 54 of the vector 52 with respect to a user viewing direction 82, also referred to as user normal vector, e.g. for positioning the projection 28 within a field of view 84 of the user 80.

Additionally, the geometric representation may be indicative of a distance between the view position 26 and the projection plane 24, based on which distance information the projection 28 may be positioned in the user field of view. For example, the embodiment a) described with respect to Table 2 is an example for indicating the distance and the orientation 54 in the geometric representation 50.

In other words, as illustrated in FIG. 8, on the side of an edge cloud server, a rendered camera view 28 may be obtained by projecting volumetric video object 20 onto a plane within a field of view 25 of a virtual camera 26. The rendered view 28 may be transmitted and may be integrated to a user field of view 84 in a 3D scene on the client side.

According to embodiments, the vector 52 is not perpendicular to the projection plane 24, but the projection plane 24 may be tilted with respect to a normal plane which is perpendicular to a straight line, e.g. vector 52, between the view position 26 and a point describing the position of the projection plane, e.g. a center of the projection plane or an edge of the projection plane. In other words, the projection plane may be tilted with respect to the shown in FIG. 8.

Accordingly, in embodiments, the geometric representation 50 is indicative of an orientation, e.g. a tilt, of the projection plane 24 with respect to a straight line between the view position and the projection plane. The straight line may coincide with the vector 52. In examples, the straight line may be defined as the normal of the plane 24 leading through the view position 26. Signaling the orientation of the plane 24 allows for an accurate adaption of the projection 28 to a movement of the user position with respect to the view position 26, and for an accurate consideration of occlusion or further object interactions.

In other words, in the so-called plane mode, the volumetric object 20 is rendered as a texture for a plane 24 in 3D user space, e.g. when the user changes his viewport 82 by changing yaw, for instance, the server side rendering is unaffected by this as only the user orientation but not the user position changes relative to the object.

As part of the invention, sample mapping may be based on perspective projection (or zero-projection or plane-projection), i.e. the projected picture describes a plane in 3D-space, as opposed to a sphere as in the equirectangular projection of a cube when a cubemap projection is used.

In all of the previous embodiments, the geometric representation 50 may optionally be indicative of a size of the projection plane 24, e.g. a first and a second dimension of the projection plane, e.g. a horizontal and a vertical size, e.g. parameters plane_hor_size and plane_ver_size as described below. In particular, in the embodiments described with respect to FIG. 8, the boundaries of the projection plane 24 may be defined by the size of the projection plane 24, measured from a point to which vector 52 points.

Further, according to embodiments, the bitstream 601 may include an information about the view position 26 and/or the perspective viewing direction, which e.g., describes a direction of the perspective from the view position 26 used for the projection 28. Thus, apparatus 12 may consider a difference between the view position/viewing direction used for projecting the object 20 with a current user position/user viewing direction in the rendering of a rendered picture for presentation to the user.

According to embodiments, the bitstream 601 may comprise supplemental information, which is descriptive of the bitstream, the supplemental information comprising a projection syntax structure, e.g. a perspective projection syntax structure as described in Table 1 or Table 3, signaling the geometric representation. e.g. a supplemental enhancement information (SEI) message. For example, if the bitstream is a video bitstream, e.g. according to AVC, HEVC or VVC, the projection syntax structure may be signaled in a supplemental enhancement information (SEI) message. In the following, examples for a syntax for signaling the geometric representation 50 are given, which may be applicable in VVC, cf. Tables 1 to 7.

In other words, the perspective projection may be indicated through a perspective projection SEI message. As a first option, a SEI message is indicating the plane position for which the decoded picture has been produced, i.e. at which the perspective projection has been performed for an object.

TABLE 1

| | Descriptor |
|---|---|
| perspective_projection( payloadSize) { | |
| rlp_cancel_flag | u(1) |
| if( !rlp_cancel_flag) { | |
| rlp_persistence_flag | u(1) |
| plane_params_present_flag | u(1) |
| if ( plane_params_present_flag ) { | |
| plane_params( ) | |
| } | |
| } | |
| } | |

Wherein the plane_params syntax structure encompasses all parameters that are necessary on client side to identify, position, orient the plane, in other words, the geometric properties of the plane. An example of plane_params is given in Table 2.

TABLE 2

| | Descriptor |
|---|---|
| plane_params( ) { | |
| plane_id | u(8) |
| coord_scale | u(32) |
| num_plane_coeffs_minus1 | u(8) |
| for(i = 0; i <= num_plane_coeffs_minus1; i++ ) | |
| plane_coeff[ i ] | u(32) |
| plane_hor_size | u(32) |
| plane_ver_size | u(32) |
| } | |

plane_id indicates the identifier of the plane indicated through the plane_params( ) syntax structure.

coord_scale determines the scales the of the coordinate system used for the plane with respect to the real world.

num_plane_coeffs_minus1 plus 1 indicates the number of coefficients used for defining the plane.

plane_coeff[i] represent parameters of the respective plane. Different embodiments exist:

a) three parameters such as distance between camera/user and object and orientation (yaw/pitch) wrt to user viewing direction, or
b) four coefficients a,b,c,d for the general form of the plane equation ax+by +cz+d=0, or
c) six coefficients and coordinates a,b,c,x,y,z for the point-normal form of the plane equation $a(x-x_0)+b(y-y_0)+c(z-z_0)=0$ with $x_0$,$y_0$ and $z_0$ being the origin of the coordinate system such as user or camera position, or plane_hor_size and plane_ver_size define the horizontal and vertical size of the plane around the signified plane point (e.g. from the coefficients or additional signalling for a plane center point or derivation from the user/camera viewing center vector crossing the indicated plane). Alternatively, this can express Field of View (FoV) of the virtual camera used to depict the object.

Depending on which plane_coeff embodiment is used, positioning of the indicated plane maybe more or less constrainted. E.g. when only distance and orientation of the plane are indicated, the plane is constrained to be oriented perpendicular to the user as indicated in FIG. 8. Having a higher degree of freedom in positioning the plane can be advantageous when a communication delay between server and client leads to noticeable difference of client side user position and server-side rendering camera position, e.g. due to fast user or object movement. When a client is aware of the communication latency, the delay can be compensated through warping the texture views and further corresponding infos (alpha mask, depth mask and so on) to mitigate the visual effects. Further, a higher degree of freedom in positioning the plane can be facilitated to positions planes perpendicular to the viewing direction of both eyes when stereo views are presented.

Resuming the general description of embodiments of the first aspect according to FIG. 6 to FIG. 8, according to embodiments, bitstream 601 may comprise respective representations 40 of a number of objects 20, that is one or more objects, each of the objects being represented by a respective volumetric representation. To be more precise, the bitstream 601 may comprise representations of a number of pictures, each of which represents a projection 28 of the volumetric representation of one of the objects onto a one of a number of projection planes 24, the projection 28 being as described with respect to FIG. 6 to FIG. 8. According to these embodiments, the bitstream 601 comprises a number of geometric representations 50, e.g., one for each of the number of projection planes 24.

In other words, there may be one or more further pictures, beyond the one mentioned with respect to FIG. 6, which relate to one or more further objects and their projections onto respective planes.

According to embodiments, the bitstream is a multi-layered video bitstream, and the number of pictures are signaled in respective layers of the bitstream. For example, the geometric representations for the respective projection planes may be signaled in a projection syntax structure. According to alternative embodiments, as will be described with respect to the second aspect, the number of pictures are signaled by means of a composed picture. It is noted, that the second aspect is fully combinable with the first aspect of using a plane-projection.

The perspective_projection syntax structure shown in Table 3 may represent an example for the projection syntax structure for signaling a number of geometric representations for a respective number of pictures.

In other words, in typical scenarios, the considered applications consist of several virtual objects that are added to the scene. In such a case, several planes might be used to project the different objects, being these placed at different positions. Therefore, another option that can be applied is to have a per-region signaling, that indicates for each region, which plane it corresponds to, in particular, in case the region-wise signaling as described with respect to the second aspect is applied.

TABLE 3

| | Descriptor |
|---|---|
| Perspective_projection( payloadSize) { | |
| rlp_cancel_flag | u(1) |
| if( !rlp_cancel_flag) { | |
| rlp_persistence_flag | u(1) |
| plane_params_present_flag | |
| if ( plane_params_present_flag ) { | |
| num_planes_minus1 | u(8) |
| for( i = 0; i <= num_planes_minus1; i++ ) { | |
| plane_params( ) // for i-th plane | |
| } | |
| } | |
| } | |
| } | |

As the user position may change over time, the projection plane 24 may do so accordingly. Thus, the projection plane 24 may be associated with a specific time instance. In case that bitstream 601 is a video bitstream, the one or more projection planes 24 may therefore be indicated on a per-time-frame basis, for the example of VVC, for an access unit of the video bitstream. Alternatively, each of the time frames, or access units, may be associated with a one or more geometric representation, so that the geometric representations are not necessarily signaled for each time frame. In the case that the bitstream 601 comprises representations 40 of multiple objects, multiple geometric representations may be associated with one or more time instances, respectively. For example, the association may be implicit associated, e.g. the geometric representations 50 are signaled in an information syntax structure (e.g. SEI message) which is related to a picture or picture group of the time instance (e.g. related to an access unit). As mentioned above, each of the projections 28 is performed using one of the projection planes 24, however, in examples, a projection plane 24 may be used for the projections 28 or more than one object. According to embodiments, the bitstream is free of two geometric representations which are associated with an identic one of the time instance and which are indicative of an equivalent size and/or position of the respective projection planes. Thus, if the projection planes 24 used for the projections 28 of two objects are identical, they may be associated with the same projection plane without signaling the projection plane twice.

In other words, in one embodiment, it is a requirement of bitstream conformance that no two planes that are indicated for one time instance, i.e. an access unit, in the Perspective_projection SEI message coincident with the same horizontal and vertical size.

Alternatively or additionally, the bitstream may be free of two geometric representations 50 which are associated with an identic one of the time instances and which are associated with an identic identifier.

In other words, in another embodiment, it is a requirement of bitstream conformance that no two planes that are indicated for one time instance, i.e. an access unit, in the Perspective_projection SEI message have the same value of plane_id.

Resuming the general description of the embodiments, the representation 40 of the picture representing the projection 28 may be indicative of values for samples of the picture. According to embodiments, the picture comprises, for the samples of the picture, respective values for one or more information types out of color information, a texture information, a transparency information, a depth information, a reflectivity information, and a translucency information. In other words, the representation of the picture may comprise an overlay of one or more maps such as a texture map, transparency map, a depth map, a reflectivity map and/or a translucency map. It is noted, that the maps do not necessarily have the same resolution or number of samples. A beneficial signaling of the representation 40, in particular if the representations are indicative of multiple information types, e.g. not only texture but additionally one or more of depth, transparency, reflectivity, translucency, is described with respect to the third aspect, which is fully combinable with the first aspect, also in additional combination with the second aspect. Signaling one or more of depth, transparency, reflectivity, translucency may allow the apparatus 12 for integrating the projection 28 more realistic into the view 94 of the user 80.

Bitstream 601 may be provided by an apparatus 10 for providing a bitstream, e.g. apparatus 10 according to FIG. 3. Accordingly, apparatus 10 may obtain the picture which represents the projection 28, and may provide the representation 40 of the picture and the geometric representation 50 in the bitstream 601. For example, to this end, apparatus 10 may encode the picture to obtain the representation 40 of the picture.

Apparatus 10 may receive the picture, or may perform the projection of the volumetric representation 22 for obtaining the picture. Naturally, same holds for the multiple pictures in the case that multiple pictures of multiple objects are to be encoded.

Apparatus 10 may retrieve the user position from a bitstream, e.g. a feedback bitstream, e.g. comprising the information 16 as described with respect to FIGS. 3 and 4. Apparatus 10 may use the user position for determining the view position, e.g. by using the user position as the view position or by performing a coordinate transformation and/or by considering a predicted movement of the user.

According to some embodiments, apparatus 10 may retrieve a position of the object 20 within the 3D space 30 from the bitstream 16 (the feedback bitstream), and determine the projection 28 accordingly, e.g. considering the relative arrangement between the user position and the object position. Alternatively or additionally, apparatus 10 may further receive a user viewing direction from bitstream 16, and consider same for obtaining the projection 28, e.g., by determining the perspective viewing direction from the user viewing direction, e.g. use the user viewing direction as the perspective viewing direction.

According to embodiments, apparatus 10 may retrieve a user focus from the bitstream 16 and use same for determining the picture, e.g. by filtering, e.g. blurring, the picture in dependence on a relation between the object position in the 3D space and the user focus.

Further, bitstream 601 may be processed by apparatus 12, e.g. as described with respect to FIG. 4. To this end, apparatus 12 may retrieve the representation 40 and the geometric representation 50 from the bitstream. For example, the geometric representation 50 being or the picture being described to comprise a feature or an information, the apparatus 12 may be configured to retrieve the feature or the information from the bitstream 601.

Apparatus 12 may use the geometric representation 50 for rendering a rendered picture of a 3D scene within the 3D space from the perspective of a current user position. As described before, the user position may, e.g., correspond to the view position in 3D space, e.g., the view position 26 may be based on the user position transmitted by the apparatus 12 for processing the bitstream to a server (e.g. the apparatus 10 for providing a bitstream), or an updated position with respect to a previous user position, which may have been used as the view position or for determining the view position. For example, the rendered picture may serve as an overlay to the real world in the view 94 of user 80, e.g. in a XR scenario. To this end, apparatus 12 may include pictures of one or more objects 20 into the rendered picture.

According to embodiments, apparatus 12 may use the geometric representation 50 for determining a position of the object within the 3D scene and/or for determining a contribution of the picture to the rendered picture. For example, parts of the picture which represent non-occluded parts of the geometric representation 50 contribute to the rendered picture.

According to embodiments, apparatus 12 may compare the view position 26 with the current user position. E.g. the bitstream 601 may include an information about the view position. Apparatus 10 may accordingly consider a difference between these two position for rendering the rendered picture, e.g. by warping the picture in dependence on the position difference.

Naturally, these embodiments of the apparatus 12 may be combined with the features described with respect to the following FIGS. 9 to 13. In particular, the apparatus 12 may combine the projections 28 of multiple objects within the rendered picture. For example, apparatus 12 may retrieve the pictures of multiple projections from a composed picture and/or may consider multiple information types of the one or more picture.

Figure 9:
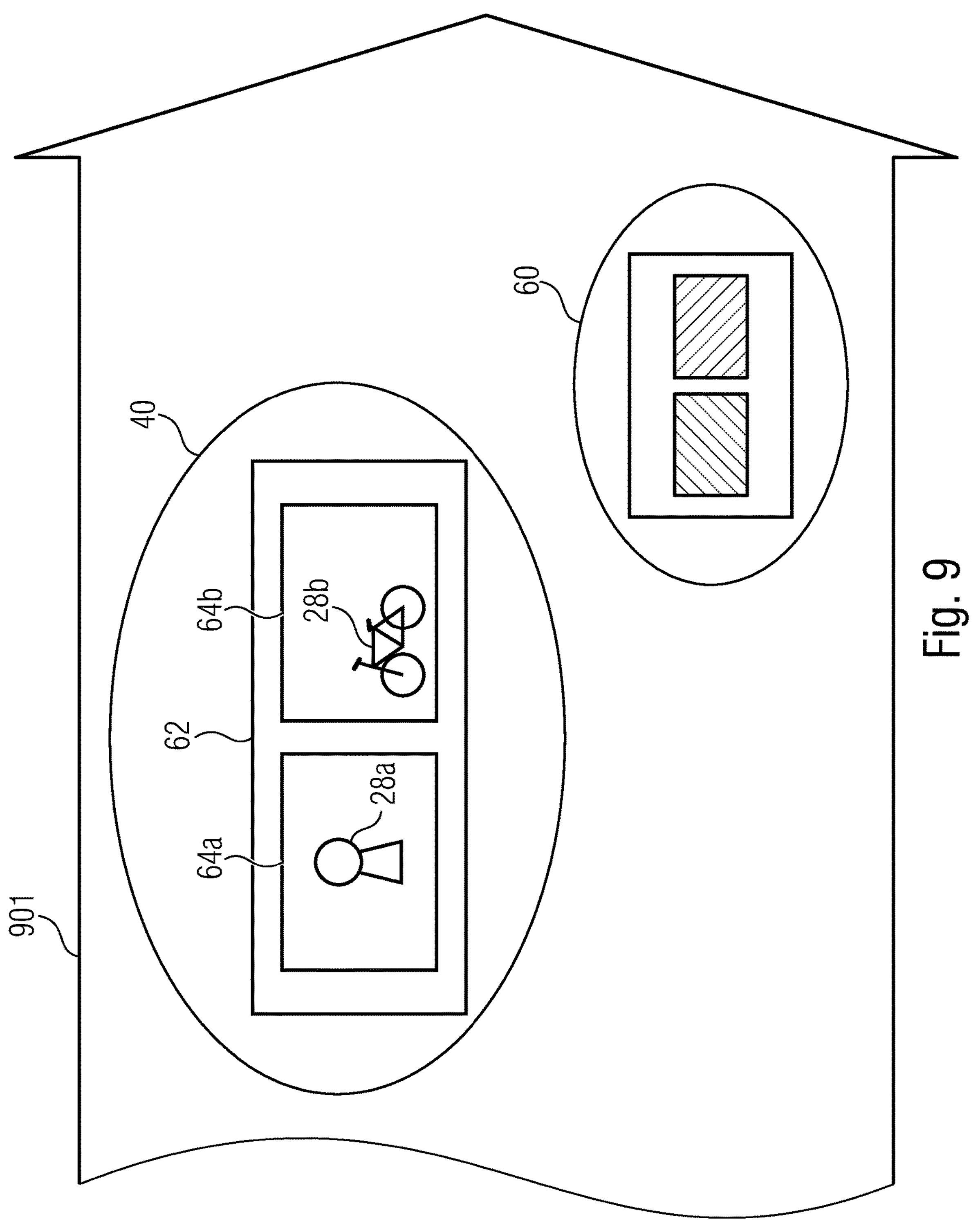
FIG. 9 illustrates a bitstream according to an embodiment of the second aspect.

FIG. 9 illustrates a bitstream 901 for signaling visual content according to an embodiment of the second aspect. The bitstream 901 may optionally be an example of the bitstream 14 and/or may be in accordance with bitstream 601 and/or 1001. In embodiments, bitstream 901 is a video bitstream. Bitstream 901 comprises a representation 40 of a composed picture 62, the composed picture comprising, e.g., representing, a number of pictures, e.g. one or multiple pictures. Each of the pictures is represented by one or more regions 64 of the composed picture. The one or more regions 64 are illustrated in FIG. 9 by an exemplary number of two regions, namely region 64*a* and region 64*b*. The pictures represent projections 28 of a number of corresponding volumetric representations 22 of a number of respective objects 20 onto a number of respective projection areas 24. E.g., in FIG. 9, the picture of region 64*a* represents a projection 28*a*, and the picture of region 64*b* represents a projection 28*b*. The bitstream 901 further comprises a region projection indication 360 which associates one of the regions 64 of the composed picture 62 with one of the pictures. For example, the region indication 360 associates each of one or more pictures represented by the composed picture 62 to a respective region 64 within the composed picture.

For example, the pictures of the composed picture 62 may have uniform or individual sizes. The pictures may be regularly or irregularly positioned within the composed picture 62. The pictures may be positioned adjacent to each other or may be separated by samples, e.g. spacing samples. Portions of the composed picture 62, to which portions the regions 64 are associated, may be non-overlapping.

It is noted that the description of the projections 28, and how they are obtained, and the description of the representation 40, as provided with respect to the first aspect, in particular FIG. 6 to FIG. 8, may optionally apply to embodiments of the second aspect. It is noted, however, that according to the second aspect, the projection 28 is not necessarily a plane projection, i.e., the projection area 24 is not necessarily a plane, but for example, a spherical area. Depending on the type of projection, the projection may be performed from the perspective of a view position, as in the case of the plane projection described with respect to the first aspect. E.g. the projections may be obtained using a common view position. In other words, each of the projections 28, e.g 28*a* or 28*b*, may be a projection onto a projection plane 24 associated with the projection.

For example, a first region 64*a* may comprise sample values of a first picture, and a second region 64*b* may comprise sample values of a second picture. The composed picture 62 may comprise, for one or more of the pictures representing projections 28*a*, 28*b* of respective objects, sample values for one or more of information types (cf. third aspect). For example, a region 64 of the composed picture 62 may refer to a portion of samples of the composed picture 62. In other words, the composed picture may be represented by a map, holding sample values for the samples of the composed picture. A region 64 of the composed picture may refer to a region of the map comprising corresponding samples of the composed picture.

Accordingly, the pictures may comprise respective pluralities of samples, each sample, e.g., being associated with a position of a sample array of the composed picture 62. The samples of one of the pictures may be associated with positions within the region 64 associated with the picture. For example, the region 64 associated with a picture comprises a sample value for each of the samples, e.g. each of the regions comprises a sample value for each of the samples of the picture associated with the respective region.

According to embodiments, the bitstream 901 comprises respective geometric representations 50 of the projection areas 24 using which the projections 28, e.g. 28*a*, 28*b*, are obtained. For example, in case that the projection areas are planes, the geometric representation 50 may be indicated as described with respect to the first aspect.

Accordingly, the bitstream 901 may be indicative of one or more geometric representations 50. For example, each of the geometric representations may be associated with an identifier, e.g. plane_id parameter, as in the above described perspective projection syntax structure.

Accordingly, each of the projections 28 may have an associated geometric representation which describes the projection area 24 for the respective projection. The association between a projection 28 and a geometric representation may be realized by indicating a geometric representation for each of the projections, e.g. by means of the identifier. The geometric representation associated with the projection plane 24 for a specific projection 28 may be referred to as the predetermined geometric representation.

According to embodiments, the bitstream 901 comprises supplemental information, e.g. a SEI message. The supplemental information may comprise a region syntax structure which signals the region projection indication 60. E.g. in the example of a VVC conformant bitstream, the region syntax structure may be a regionwise_packing (RWP) syntax structure, or the below introduced regionwise_packing_extension syntax structure (RWPE SEI message) or a split_rendering_information syntax structure.

According to embodiments, the region projection indication 60 is indicative of one or more or all of the geometric representations 50 of the projection areas 24. For example, the region projection indication 60 may include one or more or all of the geometric representations 50. Geometric representation 50 not signaled in the region syntax structure may be signaled in an additional projection syntax structure which may be part of the supplemental information, e.g. the projection syntax structure described with respect to the first aspect. That is, for example, for geometric representations 50 not signaled in the region projection indication 60, the region projection indication 60 may point to a geometric representation signaled in the projection syntax structure. See for example the embodiment of Table 4, in which rwp_rlp_plane_id[i] (where i specifies the region 64) points to a geometric representation, in case that the geometric representation (plane_parameters( )) is not indicated in the region syntax structure. According to an alternative embodiment, all geometric representations are signaled in a projection syntax structure, the region projection indication 60 pointing to the respective geometric representation.

According to embodiments of the interplay between the region projection indication 60 and the projection syntax structure, the region projection indication 60 indicates if (or alternatively, if not) the geometric representation for one of the regions 64 is signaled in the projection syntax structure, e.g. syntax element rwp_plane_params_present_flag[i] in Table 4. Additionally, the region projection indication 60 may optionally indicate, with which of the geometric representations signaled in the projection syntax structure the region 64 is associated, e.g. by rwp_rlp_plane_id[i] in Table 4.

According to embodiments, the region projection indication 60 explicitly indicates the geometric representation 50 for each of the regions 64, e.g. by signaling the geometric representation 50 or by pointing to one in the projection syntax structure. Alternatively, the region projection indication 60 does not necessarily indicate the geometric representation 50 explicitly for each of the regions, but only of one or more of the regions. In this case, the region projection indication 60 may indicate whether it includes an explicit signaling (or not), see e.g. plane_info_present_flag[i] in Table 4. E.g., in case that there is no explicit signaling, the geometric representation signaled for a preceding region is to be used for the respective region.

Figure 10:
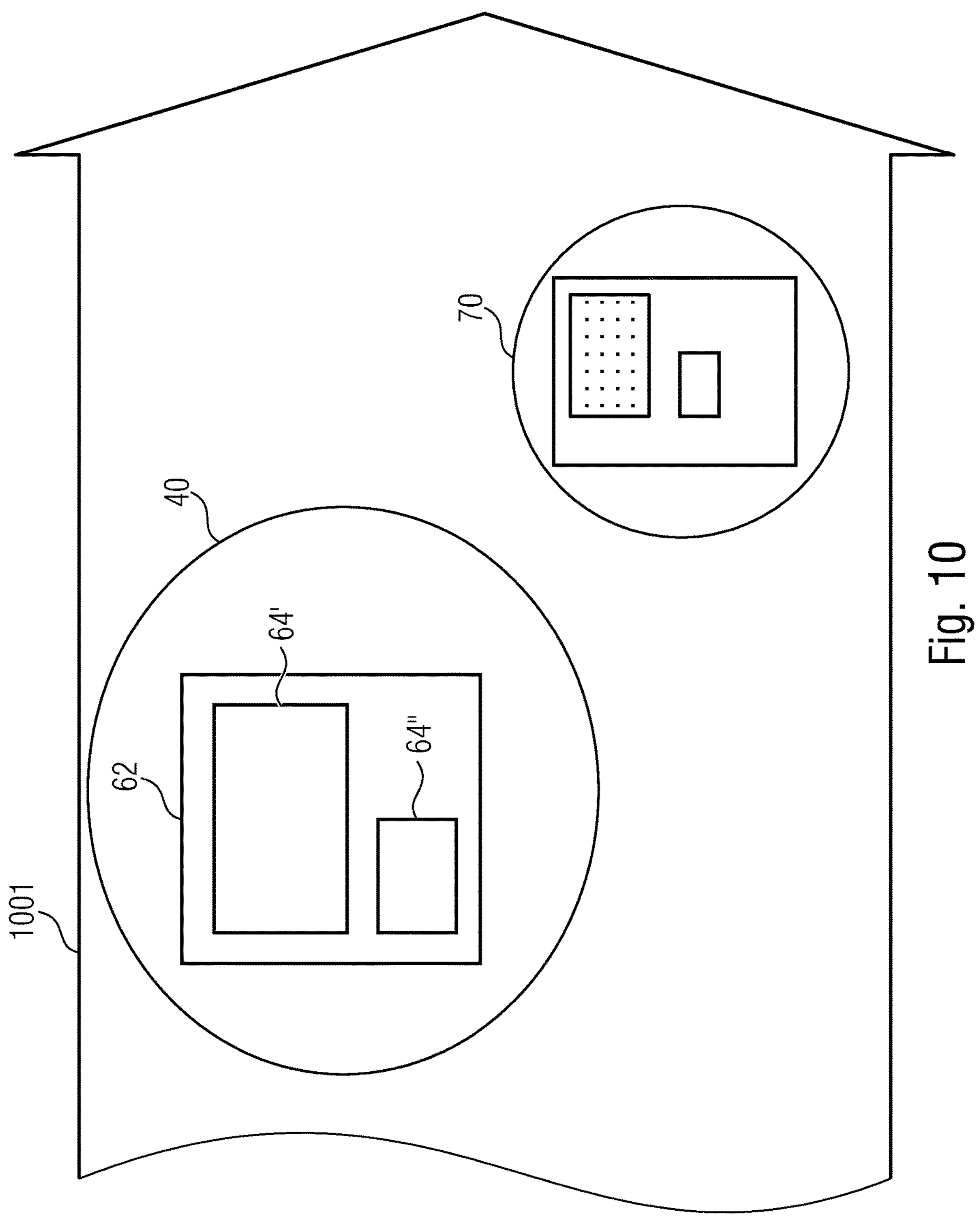
FIG. 10 illustrates a bitstream according to an embodiment of the third aspect.

FIG. 10 illustrates a bitstream 1001 for signaling visual content according to an embodiment of the second aspect. The bitstream 1001 may optionally be an example of the bitstream 14 and/or may be in accordance with bitstream 601 and/or 1001. In embodiments, bitstream 1001 is a video bitstream. The bitstream 1001 comprises aa representation 40 of a composed picture 62 comprising a number of regions 64. For example, the concept of a composed picture may correspond to the one described with respect to FIG. 9. In FIG. 10, the number of regions 64 is represented by an exemplary number of two regions, namely regions 64', 64". The composed picture 62 of FIG. 10 is indicative of a picture which comprises, for samples of the picture, respective numbers of sample values for a number of information types. Further, the bitstream 1001 comprises a region type indication 70 which associates one of the regions 64 of the composed image 62 with one of the information types. It is noted, that the numbers of sample values may be different or equal for the information types. Accordingly, regions may have different or equal sizes.

For example, one of the regions 64 which is associated with one of the information types comprises the sample values of the picture for the associated information type. The association between the regions 64 and the information type may be signaled in the region type indication 60.

The information types may include those described with respect to FIG. 9. For example, the number of information types includes one or more of a color information, a texture information, a transparency information (e.g. an alpha channel), a depth information, a reflectivity information, and a translucency information.

According to embodiments, the number of information types includes one or both or all of a first, a second and a third type of reflectance information. The first reflectance information indicates a brightness in dependence on a lighting type, e.g. diffuse lighting or specular lighting, and/or in dependence on a lighting intensity. The second type of reflectance information indicates a degree of reflectivity, e.g. an amount of light reflected by the respective sample. The third type of reflectance information indicates a reflectivity type, e.g. diffuse or specular reflectivity. Accordingly, apparatus 12 may render the rendered view in dependence on the lighting type or the lighting intensity which actually applies to the scenario of user 80. In examples, one or both or all of the first to third reflectance information comprises an information about a dependency of the respective reflectance information on an angle of incidence, e.g. of light considered for reflection.

According to embodiments, the bitstream 1001 comprises supplemental information, e.g. a SEI message, e.g. as described with respect to the first and second aspects. The supplemental information comprises a region syntax structure, e.g. a structure of the type as described with respect to FIG. 9, the region syntax structure signaling the region type indication 70.

The syntax region structure, in which the region type indication 70 is signaled, may, for example comprise an indication of a key color background information, which is indicative of one or more key colors, e.g. one or more color values or color value ranges, to be interpreted as transparence indicator, e.g., so that samples, a sample value of which corresponds to the key color, may be interpreted to be transparent.

According to embodiments, the region syntax structure comprises a region specific information for one or more of the information types associated with the regions, wherein the region specific information is to interpret the sample values for the respective information type. That is, for example, the region specific information may indicate, for the information type to which the region is associated, how to interpret the information type. Accordingly, the same information type may be interpreted differently for different regions, such allowing for a more flexible indication of the region type. Alternatively, the region specific information may apply to all regions of the information type. For example, the respective region specific information for at least one of the information types, e.g. the transparency information, indicates, that the sample values of the respective region are to be interpreted according to a respective information type specific information. For example, the bitstream 1001 comprises the information type specific information, e.g. as part of information referring to a group of pictures or an access unit. Accordingly, the region specific information is not required to be signaled individually for the region. Accordingly, in embodiments, the bitstream 1001 comprises, for at least one of the information types, e.g. the transparency information, at least one of the region specific information or the information type specific information.

Figure 11:
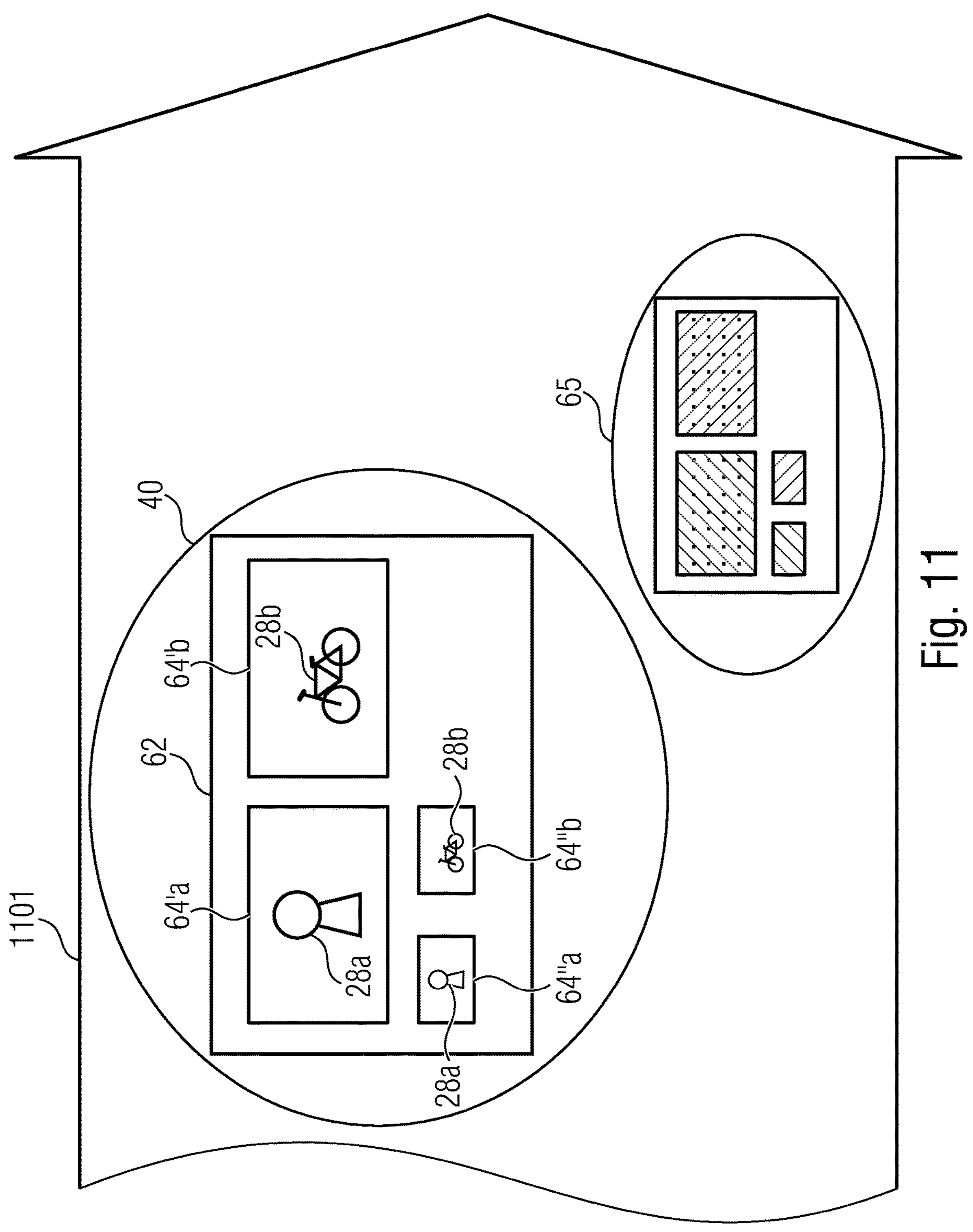
FIG. 11 illustrates a bitstream according to an embodiment combining the second and third aspects.

FIG. 11 illustrates a bitstream 1101 for signaling visual content according to an embodiment of the second aspect. The bitstream 1001 may optionally be an example of the bitstream 14. The bitstream 1101 is in accordance with bitstream 601 and 1001 of FIG. 10 and FIG. 11. That is, the bitstream 1101 is an example of the bitstream 1001 according to which the composed picture 62 comprises a number of pictures represented by respective regions 64 of the picture, as described with respect to FIG. 10. Thus, FIG. 11 illustrates an example of how the second and third aspects may be combined. As illustrated in FIG. 11, bitstream 1101 comprises, for a first picture, representing a projection 28*a*, regions 64*a*' and 64*a*", which comprise sample values of two information types for the projection 28*a*. Similarly, bitstream 1101 comprises, for a second picture, representing a projection 28*b*, regions 64*b*' and 64*b*", which comprise sample values of two information types (for example, but not necessarily, the same ones as for the projection 28*a*) for the projection 28*b*.

Further, bitstream 1101 comprises supplementary information 65, including the region projection indication 60 and the region type indication 70. It is noted, that all feature described with respect to FIGS. 9 and 10 may be combined.

In other words, for example, a first region, e.g. the region 64*a*' may comprise sample values of a first information type for a first picture, and optionally a second region, e.g. the region 64*a*" may comprise sample values of a second information type for the first picture. Similarly, for a second picture, a third region, e.g. the region 64*b*' may comprise sample values of a third information type (e.g. the first information type), and optionally a fourth region, e.g. the region 64*b*" may comprise sample values of a fourth information type (e.g. the first, the second or another information type). For example, the regions of one picture may have uniform or individual sizes, i.e. numbers of samples. E.g. the first information type, e.g. a texture map, may be signaled at a higher resolution than the second information type, e.g. a reflectance information or a depth map.

In other words, based on the described projection (e.g. that of the first aspect), but also on any other projection (e.g. non-plane projections), the RWP SEI message can be extended, as for example in Table 4, (e.g. parameter region_type[i]) to the RWPE SEI message as follows for the invented indications in the invention (e.g. embodiments of the third aspect). Furthermore, a perspective projection related variant (embedded signalling in RWPE or association of region to plane through plane_id) is represented by (plane_info_present_flag[i] and following if-construct in Table 4) (e.g. embodiments of the second aspect).

For example, a according to implementations, the RWPE SEI message may indicate a region type (e.g. parameter region_type[i]) for a region i or may indicate a region projection indication 60 (e.g. associating the region i with a projection area, e.g. a projection plane) for a region i, or may indicate both, a region type and a projection area (e.g. plane_info_present_flag[i] and the following if-construct in Table 4) for a region i.

In examples, the RWPE SEI may optionally additionally indicate a region specific information (e.g. if (region_type==1) for region type 1) for one or more of the region types.

TABLE 4

| | Descriptor |
|---|---|
| Regionwise_packing_extension( payloadSize) { | |
| rwp_cancel_flag | u(1) |
| if( !rwp_cancel_flag) { | |
| rwp_persistence_flag | u(1) |
| rwp_constituent_picture_matching_flag | u(1) |
| rwp_reserved_zero_5bits | u(5) |
| rwp_num_packed_regions | u(8) |
| rwp_proj_picture_width | u(32) |
| rwp_proj_picture_height | u(32) |
| rwp_packed_picture_width | u(16) |
| rwp_packed_picture_height | u(16) |
| for( i = 0; i < rwp_num_packed_regions; i++ ) { | |
| region_type[ i ] | u(4) |
| rwp_transform_type[ i ] | u(3) |
| rwp_guard_band_flag[ i ] | u(1) |

TABLE 4-continued

| | Descriptor |
|---|---|
| rwp_proj_region_width[ i ] | u(32) |
| rwp_proj_region_height[ i ] | u(32) |
| rwp_proj_region_top[ i ] | u(32) |
| rwp_proj_region_left[ i ] | u(32) |
| rwp_packed_region_width[ i ] | u(16) |
| rwp_packed_region_height[ i ] | u(16) |
| rwp_packed_region_top[ i ] | u(16) |
| rwp_packed_region_left[ i ] | u(16) |
| if( rwp_guard_band_flag[ i ] ) { | |
| rwp_left_guard_band_width[ i ] | u(8) |
| rwp_right_guard_band_width[ i ] | u(8) |
| rwp_top_guard_band_height[ i ] | u(8) |
| rwp_bottom_guard_band_height[ i ] | u(8) |
| rwp_guard_band_not_used_for_pred_flag[ i ] | u(1) |
| for(j = 0;j < 4;j++) | |
| rwp_guard_band_type[ i ][ j ] | u(3) |
| rwp_guard_band_reserved_zero_3bits[ i ] | u(3) |
| } | |
| plane_info_present_flag[ i ] | u(1) |
| if ( plane_info_present_flag[ i ]) { | |
| rwp_plane_params_present_flag[ i ] | u(1) |
| if( rwp_plane_params_present_flag[ i ]) | |
| plane_params( ) // for the plane corresponding to the i-th region | |
| }else { | |
| rwp_rlp_plane_id[ i ] // identifer of the respective plane for the i-th region | u(8) |
| } | |
| if ( region_type == 1 ) { // alpha mask | |
| [...] //region-specific content similar to Alpha channel information SEI message | |
| } | |
| } | |
| } | |
| } | |

For example, region_type[i] indicates the type of a packed region as in the example of Table 5. FIG. 12 illustrates examples for sample value maps for the respective information types.

TABLE 5

Figure 12A:
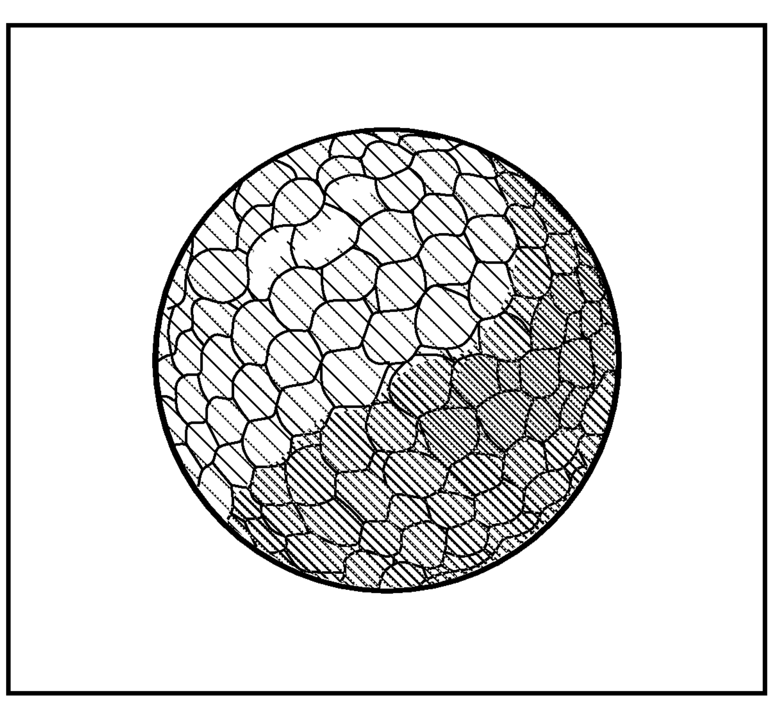
FIG. 12*a-e* illustrates examples for various information types according to embodiments.
Figure 12B:
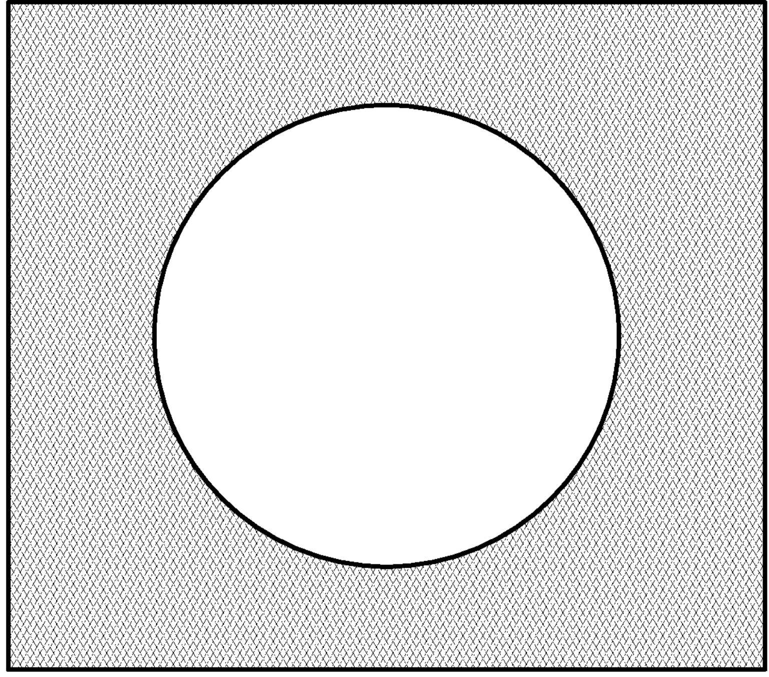
Figure 12C:
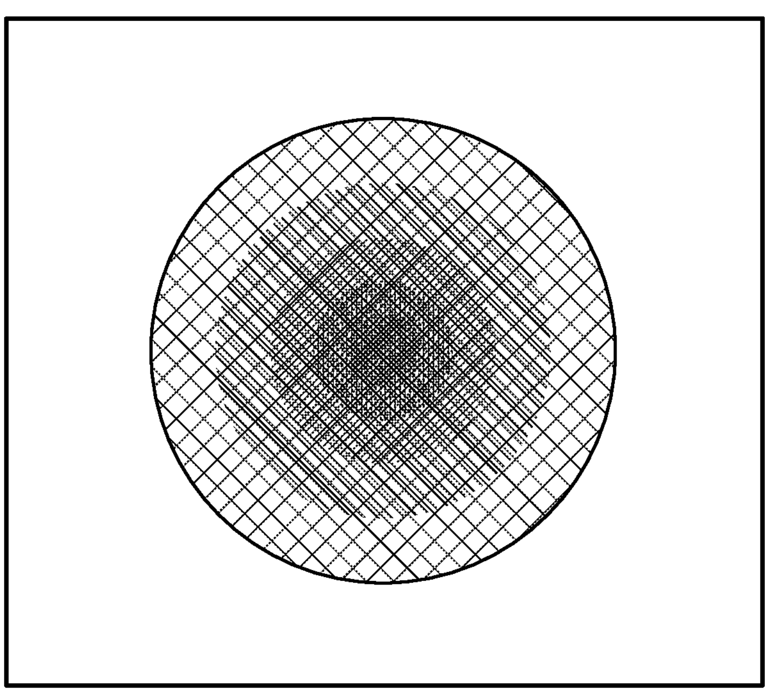
Figure 12D:
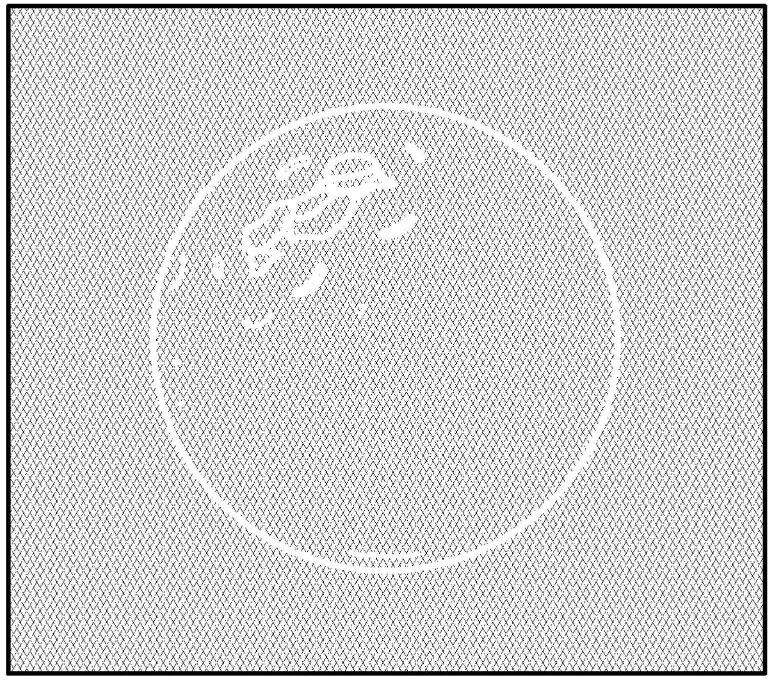
Figure 12E:
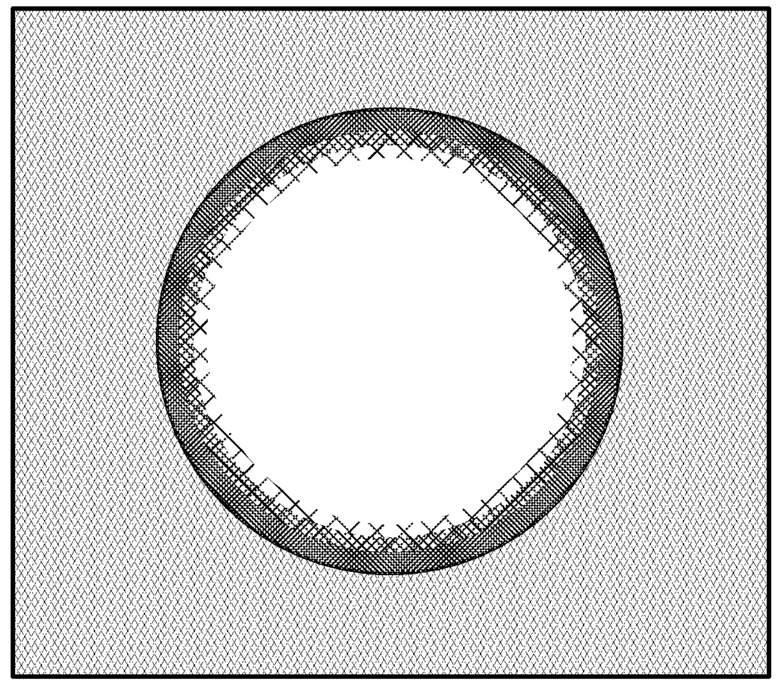

| region_type[ i ] | Information stored in the i-th region |
|---|---|
| 0 | Rendered texture view, e.g. Fig. 12a |
| 1 | Alpha or transparancy mask, e.g. Fig. 12b |
| 2 | Depth map information, e.g. Fig. 12c |
| 3 | Reflectance information, e.g. Fig. 12d |
| 4 | Translucency information, e.g. Fig. 12e |
| 5-15 | reserved |

It is noted, that in the embodiment of Table 4, the second and third aspects may be implemented independently from each other, e.g. by either skipping the region_type parameter or the plane_information parameter.

For example, when the plane parameters are indicated in a perspective projection SEI, each region of the RWPE is associated to a particular plane, e.g. through an identifier rwp_rlp_plane_id[i] or otherwise, the plane parameters are embedded directly in the RWPE syntax (e.g. the region projection indication 60). In another embodiment, it is a requirement of bitstream conformance that no two regions with equal value of region_type[i] within the Regionwise_packing_extension SEI message have the same value of rwp_rlp_plane_id[i]. Accordingly, in embodiments, in which the bitstream comprises, in supplemental information, the projection syntax structure and the region syntax structure, e.g. as described with respect to FIG. 9, the composed image 62 is free of two regions which are associated with an identic geometric representation 50 of the projection syntax structure and an identic information type.

In another embodiment (e.g. as described with respect to FIG. 9, embodiment described by claims B3.27, B1.8*a*), when no explicit signalling of plane parameters for a region or a plane identifier for a region is present (e.g., in Table 4, plane_info_present_flag[i] may be used to indicate whether there is explicit signaling or not), a region inherits the plane parameters or the plane identifier of the preceeding region within the RWPE syntax.

The syntax transmitted in the placeholder parameters ("[ . . . ]//region-specific content") may, for example, be equivalent to the information of the alpha channel information SEI message in that it is used to interpret the coded sample values (how to apply the info such as through multiplication with texture sample values, or clipping and scaling values). However, the indicated information applies only to a region signified as alpha mask and the other regions associated to the same plane.

Accordingly, the region syntax structure of bitstream 901 or bitstream 1001 may comprise a region specific information. The region specific information may, for example, relate to one or more of the information types, e.g. as in Table 4. In this case, the region specific information indicates how to interpret the sample values for the respective information type. Alternatively, the region specific information may relate to one or more of the regions 64. In this case, the region specific information indicates how to interpret the sample values for the picture associated with the respective region. In a further alternative, the region type information may be specific to both, region and information type. In this case, the region specific information indicates how to interpret the sample values for the pictures associated with a region 64 comprising sample values of the respective information type.

In another embodiment, when the RWPE SEI message, e.g. the region syntax structure, contains regions of type alpha mask and an Alpha channel information SEI message is associated with the AU, the information of the Alpha channel information SEI message is to be applied to interpret the value of all the signified alpha mask regions within the coded picture, c.f. the information type specific information as described with respect to FIG. 10.

In another embodiment (e.g. embodiment described by claims B1.21; C1.10), when no separate region is used to provide a dedicated alpha mask but textured views are accompanied with a key color background to allow background removal through chroma key on client side, additional information like the dedicated background color value can be indicated in the RWPE message to support client side processing of the texture region, c.f. the indication of the key color background information as described with respect to FIG. 10.

Reflectance information in the above is information that describes how the surface of a given depicted object reflects light in general. In one embodiment, this information is specific to the lighting situation on the rendering (or capturing) side, i.e. which regions of the object surface are bright due to diffuse or specular reflection of lighting applied at rendering/capturing or which are bright without reflectance. A client can utilize such information when an object is adjusted to the lighting situation on playout side, e.g. by reducing reflections on some object part or emphasizing on some others.

In another embodiment, the reflectance information depends on object geometry, e.g. sharp corners of an object are highlighted/emphasized in the samples of the reflectance information region (i.e. indicated to be highly reflective) whereas planar areas of object surfaces may not.

In another embodiment, the reflectance information is dependent on the material properties of the various object areas, e.g. areas maybe indicated as highly diffuse or specular reflective.

In another embodiment, the reflectance information is augmented with angular information, e.g. being specific to the angle of attack of the light.

Naturally, all of the above embodiments regarding the types of reflectance information can be combined to derive a complete view of the reflectance properties of the object on client side and apply corrections in whatever aspect is regarded as necessary.

For example, the first to third reflectance information described with respect to FIG. 10 may be implemented according to the preceding embodiments.

The depth information from the samples of a respective region in combination with the general plane position (i.e. distance to the user) and the information about user focus, can be used to, either on client side or directly on server side before encoding, render the texture view of the volumetric video object (or parts thereof) with proper depth blur so as to appear out of focus when the user focusses on a point with a different distance and the volumetric video object goes out of the user field of depth.

As described with respect to FIGS. 9 to 11, the region projection indication 60 and/or the region type indication 70 may be signaled in a region syntax structure, proving for an association between pictures and regions 64 and/or between information type and regions 64.

According to embodiments, the region syntax structure further associates the regions 64 with respective portions of the composed image, i.e. the region syntax structure may indicate, for a specific one of the regions, which portion, or which samples, of the composed picture belong to the regions. For example, the regions syntax structure is indicative of one or more of a location of the regions within the composed image, a size of the regions, an arrangement of the regions. For example, the location may be indicated by means of a position of a specific sample, e.g. the top left sample of the region, and the size may be indicated by height and width. An example is given by the regionwise packing extension SEI message of Table 4.

According to an alternative embodiment, the latter information, i.e. the information about the location of the regions 64 within the composed picture 62 may be signaled in a separate syntax structure, e.g. a region information syntax structure. The regionwise packing SEI message of VVC may be an example of a syntax structure which may be used as the region information syntax structure. For this case, an example of the region syntax structure signaling the region projection indication 60 and the region type indication 70 is the split rendering information syntax structure described in Table 6.

According to embodiments, the region information syntax structure for the composed picture 62 precedes (directly, or separated by further information) the region syntax structure for the composed picture in the bitstream 901, 1001.

According to embodiments, the region syntax structure and/or the region information syntax structures may be signaled for one or more composed pictures 64, respectively, i.e. are associated with one or more composed pictures of the bitstream. For example, the composed picture 62 may be part of an access unit, i.e. be associated with a time instance (or a group of pictures for a time instance). The region syntax structure and/or the region information syntax structures may be signaled for (or within) an access unit or group of pictures.

According to embodiments, a number of regions indicator of the region information syntax structure, e.g. sri_num_packed_regions, which is indicative of a number of regions described by the region information syntax structure equals a number of regions indicator of the region syntax structure, e.g. rwp_num_packed_regions, which is indicative of a number of regions described by the region syntax structure.

In other words, an alternative embodiment of the above inventions works as an add-on SEI message (referred to as split rendering information (SRI) SEI message) for the original RWP SEI message design by repeating the number of regions in the signaling and further only indicating the newly invented syntax elements as follows. I.e. syntax signaled in the SRI SEI message is associated to the regions indicated in the RWP SEI message. In this embodiment, it is a requirement of bitstream conformance that the split rendering SEI message follows the respective original RWP SEI message in bitstream order within an access unit. Further, it is a requirement of bitstream conformance that the value of sri_num_packed_regions in the SRI SEI message is equal to the value of rwp_num_packed_regions of the respective RWP SEI message.

TABLE 6

| | Descriptor |
|---|---|
| split_rendering_information( payloadSize) { | |
| sri_cancel_flag | u(1) |
| if( !sri_cancel_flag) { | |
| sri_persistence_flag | u(1) |
| sri_num_packed_regions | u(8) |
| for( i = 0; i < sri_num_packed_regions; i++ ) { | |
| region_type[ i ] | u(4) |
| plane_info_present_flag[ i ] | u(1) |
| if ( plane_info_present_flag[ i ]) { | |
| sri_plane_params_present_flag[ i ] | u(1) |
| if( sri_plane_params_present_flag[ i ]) | |
| plane_params( ) // for the plane corresponding to the i-th region | |
| }else { | |
| sri_rlp_plane_id[ i ] // identifer of the respective plane for the i-th region | u(8) |
| } | |
| if ( region_type == 1 ) { // alpha mask | |
| [...] //region-specific content similar to Alpha channel information SEI message | |
| } | |
| } | |
| } | |
| } | |

A further embodiment would include the region position as well as the plane information so that no further SEI message (e.g. RWP) is required. The syntax could be as shown in Table 7. Thus, the split rendering SEI message of Table 7 may be an alternative example of the region syntax structure including the information about the location of the regions in the composed picture 62.

TABLE 7

| | Descriptor |
|---|---|
| split_rendering_information( payloadSize) { | |
| sri_cancel_flag | u(1) |
| if( !sri_cancel_flag) { | |
| sri_persistence_flag | u(1) |
| sri_num_packed_regions | u(8) |
| for( i = 0; i < sri_num_packed_regions; i++ ) { | |
| region_type[ i ] | u(4) |
| packed_region_width[ i ] | u(16) |
| packed_region_height[ i ] | u(16) |
| packed_region_top[ i ] | u(16) |
| packed_region_left[ i ] | u(16) |
| plane_info_present_flag[ i ] | u(1) |
| if ( plane_info_present_flag[ i ]) { | |
| sri_plane_params_present_flag[ i ] | u(1) |
| if( sri_plane_params_present_flag[ i ]) | |
| plane_params( ) // for the plane corresponding to the i-th region | |
| }else { | |
| sri_rlp_plane_id[ i ] // identifer of the respective plane for the i-th region | u(8) |
| } | |
| if ( region_type == 1 ) { // alpha mask | |
| [...] //region-specific content similar to Alpha channel information SEI message | |
| } | |
| } | |
| } | |
| } | |

The syntax describing the regions is represented by the packed_region_width[i], packed_region_height[i], packed_region_top[i], packed_region_left[i] syntax elements. The option shown above shows the region being explicitly signalled that corresponds to a particular plane or region type. It is a requirement that regions defined in this SEI message are not overlapping.

In the foregoing description of FIGS. 3 to 12, the size of the picture representing the projection 28 of the object 20 (or respective sizes of the pictures) may depend on the size of the projection 28, or may be adapted to the size of the projection 28, and thus may depend on the size of the object and/or a desired resolution. That is, the size of the picture may be independent of a size and/or an aspect ratio of a user viewport. As the object regularly does not fill the entire user viewport, but only a portion thereof, adapting the size of the picture to the size of the object avoids signaling unnecessary samples. Further, the geometric representation 50 allows for positioning the projection 28 in the user viewport 94. This approach has the advantage, that no new rendering of a projection 28 is required when the user changes the user position.

Figure 13:
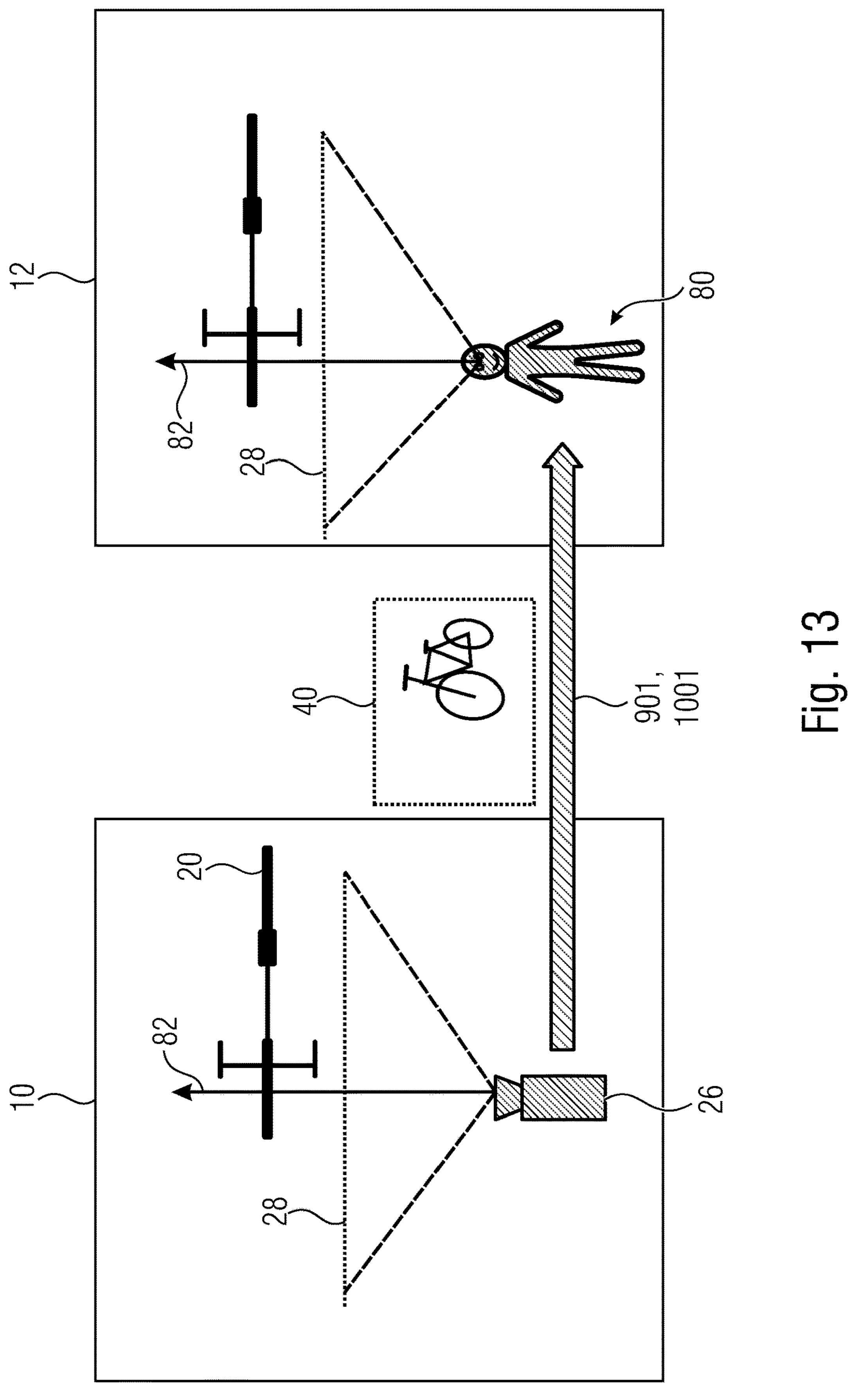
FIG. 13 illustrates an embodiment according to which the picture covers the entire user viewport.

FIG. 13 illustrates an alternative embodiment for the picture representing the projection 28. According to this embodiment, the one or more pictures cover a user viewport. For example, according to this embodiment, the size of the pictures may be independent of the size of the object 20 or the projection 28. As the picture covers the entire viewport the picture may serve as overlay to the user viewport. Also, the picture may represent the projections of multiple objects. It is noted, that according to these embodiments, the projection may optionally be a plane projection. The features described with respect to the second and third aspects may optionally also be used with these embodiments of the picture.

As illustrated in FIG. 13, the volumetric video object 20 may be projected on a plane, the captured plane depicting one or more objects in the user viewport. The picture representing the rendered view is transmitted from the server 10 to the client 12. The client device 12 may provide the projection 28 as a textured plane depicting the rendered view of virtual objects in the user viewport of user 80.

In other words, in this so-called overlay mode, the volumetric object 20 is rendered as a texture for a plane overlaying the user viewport, e.g. when the user changes his viewport in this approach by changing yaw, the server side rendering is affected by this object changes its position on the rendered viewport overlay (e.g. left- to right-hand side)

This part can be similar to the plane mode, in the sense that it should be described where from is the overlay been computed, i.e., at which position is the "camera" (e.g., position 26 at which the server thinks that the observer is) and define the observation direction, and FoV. With this information and the further auxiliary information occlusions between virtual and real world objects can be correctly estimated on client side to hide respective "occluded" sections of the rendered overlay. Further, if the user is not at the same position than the virtual camera on server side (orientation, position), some correction (warping) of the textured view (and respective alpha masks and so on) can be performed to reduce what it referred to as photon to motion latency.

As already noted, all features described with respect to FIGS. 5 to 13 may also be embodied by means of the apparatus 10 and the apparatus 12. To this end, apparatus 10 may provide the bitstream 601, 901, 1001 as described before. For example, apparatus 10 may be configured for a step 101 of obtaining the picture representing the projection 28, or obtaining the composed picture 62, and may provide the representation 40 of the picture, or the composed picture in the bitstream. Apparatus 10 may further provide the geometric representation 50 in the bitstream, as described with respect to FIGS. 6 to 8, while this feature is optional for the bitstreams 901, 1001. Apparatus 10 may further optionally provide the region projection indication 60 in the bitstream, as described with respect to FIG. 9, and/or the region type indication 70 as described with respect to FIGS. 10 to 13. Similarly, apparatus 12 may be configured for a step 121 of retrieving the representation 40, and one or more of the geometric representation 50, the region projection indication 60 and the region type indication 70 from the bitstream.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded image signal can be stored on a digital storage medium or can be transmitted on a transmission medium such as a wireless transmission medium or a wired transmission medium such as the Internet. In other words, further embodiments provide a video bitstream product including the video bitstream according to any of the herein described embodiments, e.g. a digital storage medium having stored thereon the bitstream.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A non-transitory digital storage medium having stored thereon a bitstream for signaling visual content, comprising a representation of a picture, which represents a projection of a volumetric representation of an object onto a projection plane, which is positioned in a 3D space, from the perspective of a view position in the 3D space, and a geometric representation of the projection plane in the 3D space, wherein the geometric representation is indicative of a position and an orientation of the projection plane in the 3D space, wherein the geometric representation is indicative of an orientation of the projection plane with respect to a straight line between the view position and the projection plane.

2. The non-transitory digital storage medium according to claim 1, wherein the geometric representation indicates the position and/or the orientation of the projection plane with respect to the view position.

3. The non-transitory digital storage medium according to claim 1, wherein the geometric representation indicates the position and/or the orientation of the projection plane with respect to a perspective viewing direction.

4. The non-transitory digital storage medium according to claim 1, wherein the geometric representation indicates the position and/or the orientation of the projection plane with respect to absolute coordinates of the 3D space, and wherein the view position is represented by absolute coordinates of the 3D space.

5. The non-transitory digital storage medium according to claim 1, wherein the geometric representation is indicative of a distance between the view position and the projection plane.

6. An apparatus for processing a bitstream, configured to retrieve, from the bitstream, a representation of a picture, which represents a projection of a volumetric representation of an object onto a projection plane, which is positioned in a 3D space, from the perspective of a view position in the 3D space, and a geometric representation of the projection plane in the 3D space, wherein the geometric representation is indicative of a position and an orientation of the projection plane in the 3D space, wherein the geometric representation is indicative of an orientation of the projection plane with respect to a straight line between the view position and the projection plane.

7. The apparatus according to claim 6, wherein the geometric representation is indicative of a position and/or an orientation of the projection plane in the 3D space, or wherein the bitstream, and the geometric representation therein, is indicative of a position and/or an orientation of the projection plane in the 3D space.

* * * * *